United States Patent
Morse et al.

(10) Patent No.: US 12,030,342 B2
(45) Date of Patent: Jul. 9, 2024

(54) COMPOSITE BICYCLE RIM

(71) Applicant: SRAM, LLC, Chicago, IL (US)

(72) Inventors: David Morse, Indianapolis, IN (US); Michael Hall, Indianapolis, IN (US); Ruan Trouw, Mooresville, IN (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 17/989,294

(22) Filed: Nov. 17, 2022

(65) Prior Publication Data

US 2023/0147077 A1 May 11, 2023

Related U.S. Application Data

(63) Continuation of application No. 16/156,897, filed on Oct. 10, 2018, now Pat. No. 11,628,682.

(51) Int. Cl.

| | |
|---|---|
| *B60B 5/02* | (2006.01) |
| *B60B 1/00* | (2006.01) |
| *B60B 1/04* | (2006.01) |
| *B60B 21/06* | (2006.01) |

(52) U.S. Cl.
CPC ............. *B60B 5/02* (2013.01); *B60B 1/003* (2013.01); *B60B 1/043* (2013.01); *B60B 21/062* (2013.01); *B60B 1/041* (2013.01); *B60B 2360/341* (2013.01); *B60B 2900/112* (2013.01); *B60Y 2200/13* (2013.01)

(58) Field of Classification Search
CPC ......... B60B 5/02; B60B 21/062; B60B 1/003; B60B 1/043; B60B 2360/341; B60Y 2200/13
See application file for complete search history.

(56) References Cited

U.S. PATENT DOCUMENTS

| | | |
|---|---|---|
| D281,967 S | 12/1985 | Hashimoto |
| 5,249,864 A | 10/1993 | Fagan et al. |
| 7,350,877 B1 | 4/2008 | Muraoka |
| 7,377,595 B1 | 5/2008 | Okajima et al. |
| 7,926,884 B2 | 4/2011 | Heyse |
| D650,731 S | 12/2011 | Chen |

(Continued)

FOREIGN PATENT DOCUMENTS

| | | |
|---|---|---|
| CN | 1298528 | 2/2007 |
| CN | 101028784 | 9/2007 |

(Continued)

OTHER PUBLICATIONS

Benedict, Tyler, Velocite's New Venn Composite Rims Break the Mold W/ Filament Wound, Single Strand Carbon Construction, Website: Bikerumour! https://bikerumor.com/velocites-new-venn-composite-rims-break-the-mold-w-filament-wound-single-strand-carbon-construction/ , Mar. 4, 2015, last checked Jun. 7, 2023.

(Continued)

*Primary Examiner* — Kip T Kotter

(57) ABSTRACT

A rim for a bicycle wheel includes a radially inner portion disposed along an inner circumference of the rim, a first sidewall, and a second sidewall spaced apart form the first sidewall. The first sidewall and the second sidewall extend radially outward from the radially inner portion. The radially inner portion includes a stack of strips of material. The stack of strips includes a plurality of strips and a hole through the plurality of strips. The plurality of strips are nonparallel to each other. The plurality of strips are positioned about the hole through the plurality of strips.

5 Claims, 18 Drawing Sheets

(56) References Cited

U.S. PATENT DOCUMENTS

| | | | |
|---|---|---|---|
| D669,832 S | 10/2012 | Lee | |
| D673,091 S | 12/2012 | Li | |
| 8,342,614 B2 | 1/2013 | Poertner et al. | |
| 8,366,202 B2 | 2/2013 | Poertner et al. | |
| 9,149,992 B2 | 10/2015 | Yu | |
| D775,572 S | 1/2017 | Magnusson | |
| D806,627 S | 1/2018 | Lee | |
| D846,471 S | 4/2019 | Jang | |
| D858,401 S | 9/2019 | Hall et al. | |
| D860,897 S | 9/2019 | Morse et al. | |
| D898,649 S | 10/2020 | Morse et al. | |
| 2009/0058180 A1 | 3/2009 | Poertner et al. | |
| 2019/0105807 A1 | 4/2019 | Feltrin | |

FOREIGN PATENT DOCUMENTS

| | | |
|---|---|---|
| CN | 101254733 | 9/2012 |
| CN | 203282953 | 11/2013 |
| CN | 107081991 | 8/2017 |
| DE | 102007052674 | 7/2008 |
| EP | 3470238 | 4/2019 |
| JP | 61244602 | 10/1986 |
| JP | 61244602 A * | 10/1986 |
| JP | S61244602 | 10/1986 |
| TW | 200838729 | 10/2008 |
| TW | I327533 | 7/2010 |
| TW | 201634243 | 10/2016 |

OTHER PUBLICATIONS

Benedict, Tyler, "Velocite's new Venn Composite rims break the mold w/ filament wound, single strand carbon construction", bikerumor.com, Mar. 4, 2015, (7 pages).

\* cited by examiner

US 12,030,342 B2

COMPOSITE BICYCLE RIM

This application is a continuation of U.S. patent application Ser. No. 16/156,897, filed on Oct. 10, 2018, now U.S. Pat. No. 11,628,682, which is hereby incorporated by reference in its entirety.

FIELD OF THE DISCLOSURE

The present disclosure is generally directed to a bicycle rim, and more particularly, to a composite bicycle rim.

DESCRIPTION OF RELATED ART

A traditional bicycle wheel may include a rim formed of extruded metals or other materials that are bent and bonded into a circular shape having consistently shaped cross sections. Recently, other materials, such as fiber reinforced plastics, have been used in the manufacture of bicycle rims, which may be formed into circular shapes through non-extrusion based processes. Carbon fiber reinforced plastics may, for example, be used.

A method for manufacturing a fiber based, such as carbon fiber based, bike wheel relies on the stacking of individual sheets of carbon fiber material to form structures such as a side wall of the rim. The carbon fiber sheets may be pre-impregnated with a resin or other matrix material that undergoes a curing process to form the rim. The stacked layers of a sheet of carbon fiber typically include fibers oriented in different directions, respectively. At least some of the fibers of the stacked layers are oriented outside of a critical angle error, which reduces the ability of such fibers to support stresses and loads. The use of sheets of carbon fiber to manufacture a composite rim also results in a large amount of border scrap associated with cutting the sheets of carbon fiber to fit a shape of the composite rim, which increases the cost of manufacturing the rim.

SUMMARY

In one example, a rim for a bicycle wheel includes a radially inner portion disposed along an inner circumference of the rim, a first sidewall, and a second sidewall spaced apart from the first sidewall. The first sidewall and the second sidewall extend radially outward from the radially inner portion. The rim also includes a radially outer tire engaging portion disposed along an outer circumference of the rim. The radially outer tire engaging portion extends from the first sidewall and the second sidewall, respectively. The radially inner portion includes a stack of strips of material. The stack of strips includes a plurality of strips and a hole through the plurality of strips. The plurality of strips are nonparallel to each other. The plurality of strips are positioned about the hole through the plurality of strips In one example, at least one strip of the plurality of strips is made of a composite material having unidirectional fiber orientation in a direction along a length of the respective strip.

In one example, each strip of the plurality of strips of the composite material includes fibers that are parallel to the direction along the length of the respective strip. The fibers are carbon fibers.

In one example, the plurality of strips includes a first strip and a second strip. The second strip is made of a different material than the first strip, the second strip has a greater length than the first strip, the second strip has a greater width than the first strip, or any combination thereof.

In one example, the plurality of strips form at least part of the first sidewall and at least part of the second sidewall.

In one example, each strip of the plurality of strips extends to the outer circumference of the rim at the first sidewall and the second sidewall, respectively.

In one example, the plurality of strips is a plurality of first strips, and the hole is a first hole. The radially inner portion further includes a stack of second strips of material. The stack of second strips includes a plurality of second strips and a second hole through the plurality of second strips. The plurality of second strips are nonparallel to each other. The plurality of second strips are positioned about the second hole through the plurality of second strips. The second hole is positioned at a distance from the first hole along the inner circumference of the rim.

In one example, at least one first strip of the plurality of first strips is made of a different composite material than at least one second strip of the plurality of second strips.

In one example, at least one first strip of the plurality of first strips overlaps at least one second strip of the plurality of second strips.

In one example, at least one strip of the plurality of strips extends beyond the outer circumference defined by the radially outer tire engaging portion.

In one example, a rim for a bicycle wheel includes a radially outer tire engaging portion disposed along an outer circumference of the rim. The radially outer tire engaging portion has a first side and a second side spaced apart from the first side. The rim also includes a plurality of strips of a composite material arranged about a hole through the plurality of strips. The hole is radially inner relative to the radially outer tire engaging portion. Each strip of the plurality of strips of the composite material has substantially unidirectional fiber orientation in a direction along a length of the respective strip, such that at least a portion of the fibers of the respective strip are parallel to the direction along the length of the respective strip. One or more fibers of the portion of the fibers of the respective strip extend from the outer circumference of the rim, at the first side of the radially outer tire engaging portion, past the hole, to the outer circumference of the rim, at the second side of the radially outer tire engaging portion In one example, the fibers of the respective strip are carbon fibers.

In one example, the plurality of strips partially form a first sidewall, a second sidewall spaced apart from the first sidewall, and a radially inner portion disposed along an inner circumference of the rim. Each of the first sidewall and the second sidewall extends between the radially inner portion and the radially outer tire engaging portion.

In one example, the plurality of strips of the composite material is a plurality of first strips, and the hole is a first hole. The rim further includes a plurality of second strips of the composite material and a second hole through the plurality of second strips. The plurality of second strips are nonparallel to each other. The plurality of second strips are positioned about the second hole through the plurality of second strips. The second hole is positioned at a distance from the first hole along the inner circumference of the rim.

In one example, at least one first strip of the plurality of first strips overlaps at least one second strip of the plurality of second strips.

In one example, a wheel for a bicycle includes a central hub configured for rotational attachment to the bicycle. The wheel also includes a plurality of spokes attached to the central hub and extending radially outward from the hub. The plurality of spokes consist of a number of spokes. The wheel includes a rim. The rim includes a radially inner portion disposed along an inner circumference of the rim, a first sidewall, and a second sidewall spaced apart from the first sidewall. The first sidewall and the second sidewall extend radially outward from the radially inner portion. The rim also includes a radially outer tire engaging portion disposed along an outer circumference of the rim. The radially outer tire engaging portion extends from the first sidewall and the second sidewall, respectively. The radially inner portion includes a plurality of strips of one or more materials and a spoke hole through the plurality of strips. The plurality of strips are nonparallel to each other. The plurality of strips are positioned about the spoke hole through the plurality of strips. One of the number of spokes is attached to the rim via the spoke hole.

In one example, the plurality of strips includes a first strip and a second strip. The second strip is made of a different material than the first strip, the second strip has a greater length than the first strip, the second strip has a greater width than the first strip, or any combination thereof.

In one example, each strip of the plurality of strips extends to the outer circumference of the rim at the first sidewall and the second sidewall, respectively.

In one example, the plurality of strips is a plurality of first strips, the spoke hole is a first spoke hole, and the one spoke is a first spoke. The radially inner portion further includes a plurality of second strips of the one or more materials and a second spoke hole through the plurality of second strips. The plurality of second strips are nonparallel to each other. The plurality of second strips are positioned about the second spoke hole through the plurality of second strips. The second spoke hole is positioned at a distance from the first hole along the inner circumference of the rim. A second spoke of the number of spokes is attached to the rim via the second spoke hole.

In one example, at least one first strip of the plurality of first strips overlaps at least one second strip of the plurality of second strips.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
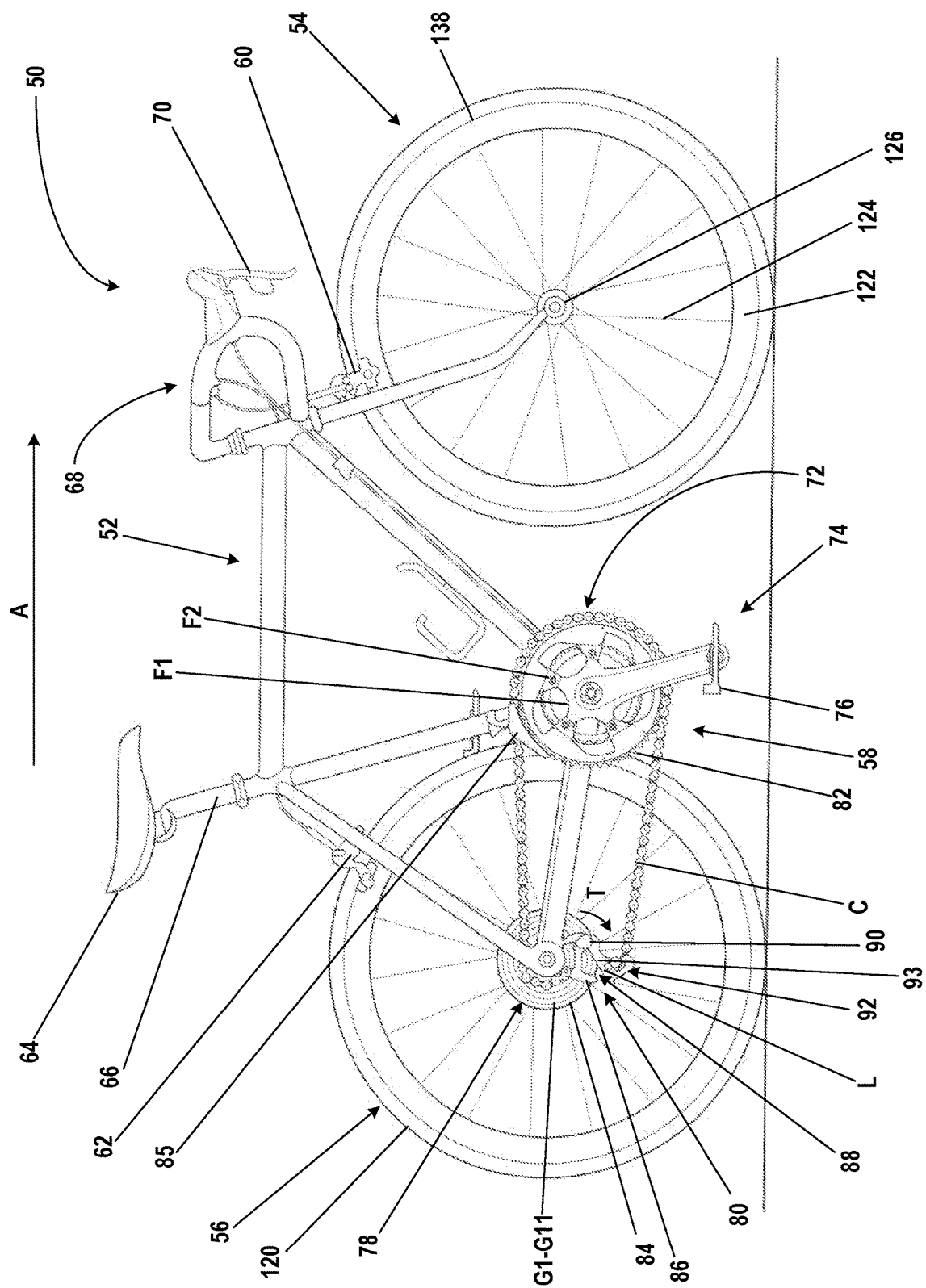
FIG. 1 is a side view schematic of a bicycle that may be constructed to utilize a composite rim.

The use of sheets of carbon fiber to manufacture a composite rim of the prior art does not allow for the discreet positioning of the carbon fibers within the rim. The present disclosure provides examples of rims and wheels that solve or improve upon one or more of the above-noted and/or other disadvantages with prior known rims and wheels. The disclosed rims are at least partially formed by strips of one or more composite materials. The strips are arranged in a stacked, fan-like pattern radially around each of the spoke holes through the rim. Continuous fibers, fiber strands, or other fiber structures, of the strips extend from a position at one side of the rim, at or adjacent to an outer diameter of the rim, tangential or adjacent to a respective spoke hole, to a position at the other side of the rim, at or adjacent to the outer diameter of the rim. Any number of strips may be stacked at each of the spoke holes of the rim so as to distribute loads from spokes at the spoke holes, respectively, or to direct any distributed loads from the outer diameter of the rim from road impacts towards load-bearing pathways in the rim.

The strips may be unidirectional fiber strips that include a number of parallel fibers providing a maximum strength in a direction of the fiber grain. The fibers are substantially aligned with concentrated load points of the spokes, and are highly diffusive with blunt loads of tire impacts. Strip placement extends radially from the respective spoke hole, and each strip after an initially placed strip at a respective spoke hole is placed on top of a last placed strip in a progressive fan pattern about the respective spoke hole. This places the fibers tangential to the respective hole. The fibers of the fan pattern extend tangentially or adjacent to the respective fan hole at a number of different angles, thus optimally reinforcing the respective spoke hole with maximum fiber interface, load dissipation, and bending stiffness. The fiber interface helps create a tougher laminate that is less prone to crack propagation or delamination, thereby increasing a pull-through strength of the respective spoke hole. Bending stiffness and load dissipation help retain an original outer rim shape under spoke tension.

An advantage of the disclosed rims is that the use of strips of one or more composite materials to form at least a portion of the rim produces a rim with a higher strength to weight ratio compared to prior art rims. Placement error in fiber orientation significantly reduces the ability of the fiber to support stresses and loads. Precisely oriented fibers allow for a higher strength-to-weight ratio of the layup, leading to increases in strength and/or decreases in weight by creating nodal reinforcements at each spoke hole location of the rim. Another advantage of the disclosed rims is that the use of strips of one or more composite materials to form at least a portion of the rim may produce a layup optimized for specific applications. For example, positioning of composite strips within a layup for a sidewall of the rim may be based on whether the sidewall is included in a front wheel or a rear wheel, whether the rim is subjected to wheel braking or rim braking, and/or whether the wheel is constructed using tangential lacing or radial lacing.

Other advantages of the disclosed rims are the ease of using multiple materials to form the rim. For example, different strips within a stack at a respective spoke hole and/or strips within different stacks may be made of different materials having different properties, respectively. Also, raw material scrap is reduced by using long, thin strips cut directly from a material roll, which eliminates border scrap that results from an intermediate cut table layup using sheets of carbon fiber of the prior art. Further, due to strip placement being optimized, material may be removed from the sidewalls of the rim, between the spoke holes. This material removal may reduce weight by, for example, up to 25% without greatly affecting strength or stiffness of the rim.

Although fiber-reinforced composites including carbon fibers are described above and below, other fiber-based materials may also be used. For example, polyamide polymer fibers, aluminum oxide based fibers, silicon carbide fibers, other fibers, or any combination thereof may be used.

Turning now to the drawings, FIG. 1 generally illustrates a bicycle 50 that employs rims constructed in accordance with the teachings of the present disclosure. The bicycle 50 includes a frame 52, a front wheel 54 and a rear wheel 56 each rotatably attached to the frame 52, and a drivetrain 58. A front brake 60 is provided for braking the front wheel 54, and a rear brake 62 is provided for braking the rear wheel 56. The bicycle 50 also generally has a seat 64 near a rear end of the frame 52 and carried on an end of a seat post 66 connected to the frame 52. The bicycle 50 also has handlebars 68 near a forward end of the frame 52. A brake lever 70 is carried on the handlebars 68 for actuating the front brake 60, the rear brake 62, or both the front brake 60 and the rear brake 62. If the brake lever 70 actuates only one of the front brake 60 and the rear brake 62, a second brake lever (not shown) may also be provided to actuate the other brake. A front and/or forward riding direction or orientation of the bicycle 50 is indicated by the direction of the arrow A in FIG. 1. As such, a forward direction for the bicycle 50 is indicated by the direction of arrow A. While the illustrated bicycle 50 depicted in FIG. 1 is a road bike having drop-style handlebars 68, the present disclosure may be applicable to bicycles of any type, including mountain bikes with full or partial suspensions.

The drivetrain 58 has a chain C and a front sprocket assembly 72, which is coaxially mounted with a crank assembly 74 having pedals 76. The drivetrain 58 also includes a rear sprocket assembly 78 coaxially mounted with the rear wheel 56 and a rear gear change mechanism, such as a rear derailleur 80.

As is illustrated in FIG. 1, the front sprocket assembly 72 may include one or more coaxially mounted chainrings, gears, or sprockets. In this example, the front sprocket assembly 72 has one or more sprockets F1, F2 each having teeth 82 around a respective circumference. As shown in FIG. 1, the rear sprocket assembly 78 may include a plurality (e.g., eleven) of coaxially mounted gears, cogs, or sprockets G1-G11. Each sprocket G1-G11 also has teeth 84 arranged around a respective circumference. The number of teeth 82 on the smaller diameter front sprocket F2 may be less than the number of teeth on the larger diameter sprocket F1. The numbers of teeth 84 on the rear sprockets G1-G11 may gradually decrease from the largest diameter rear sprocket G1 to the smallest diameter sprocket G11. Though not described in any detail herein, a front gear changer 85 may be operated to move from a first operating position to a second operating position to move the chain C between the front sprockets F1, F2. Likewise, the rear derailleur 80 may be operable to move between eleven different operating positions to switch the chain C to a selected one of the rear sprockets G1-G11. In an embodiment, the rear sprocket assembly 72 may have more or fewer sprockets. For example, in an embodiment, a rear sprocket assembly may have twelve or thirteen sprockets. Dimensions and configuration of the rear derailleur 80 may be modified to accommodate a specific implemented plurality of sprockets. For example, an angle and length of the linkage and/or the configuration of the cage of the derailleur may be modified to accommodate specific sprocket combinations.

The rear derailleur 80 is depicted as a wireless, electrically actuated rear derailleur mounted or mountable to the frame 52, or frame attachment, of the bicycle 50. The electric rear derailleur 80 has a base member 86 (e.g., a b-knuckle) that is mounted to the bicycle frame 52. A linkage 88 has two links L that are pivotally connected to the base member 86 at a base member linkage connection portion. A movable member 90 (e.g., a p-knuckle) is connected to the linkage 88 at a moveable member linkage connection portion. A chain guide assembly 92 (e.g., a cage) is configured to engage and maintain tension in the chain and has one or more cage plates 93 with a proximal end that is pivotally connected to a part of the movable member 90. The cage plate 93 may rotate or pivot about a cage rotation axis in a damping direction and a chain tensioning direction T. Other gear changing systems, such as mechanically or hydraulically controlled and/or actuated systems may also be used.

A motor module may be carried on the electric rear derailleur 80 with a battery. The battery supplies power to the motor module. In one example, the motor module is located in the movable member 90. However, the motor module may instead be located elsewhere, such as in one of the links L of the linkage 88 or in the base member 86. The motor module may include a gear mechanism or transmission. As is known in the art, the motor module and gear mechanism may be coupled with the linkage 88 to laterally move the cage plate 93 and thus switch the chain C among the rear sprockets (e.g. G1-G11) on the rear sprocket assembly 78.

The cage plate 93 also has a distal end that carries a tensioner cog or wheel. The wheel also has teeth around a circumference. The cage plate 93 is biased in the chain tensioning direction T to maintain tension in the chain C. The chain guide assembly 92 may also include a second cog or wheel, such as a guide wheel disposed nearer the proximal end of the cage plate 93 and the movable member 90. In operation, the chain C is routed around one of the rear sprockets (e.g. G1-G11). An upper segment of the chain C extends forward to the front sprocket assembly 72 and is routed around one of the front sprockets F1 or F2. A lower segment of the chain C returns from the front sprocket assembly 72 to the tensioner wheel and is then routed forward to the guide wheel. The guide wheel directs the chain C to the rear sprockets (e.g. G1-G11). Lateral movement of the cage plate 93, tensioner wheel, and guide wheel may determine the lateral position of the chain C for alignment with a selected one of the rear sprockets (e.g. G1-G11).

The bicycle 50 may include one or more bicycle control devices mounted to handlebars 68. The bicycle control devices may include one or more types of bicycle control and/or actuation systems. For example, the bicycle control devices may include brake actuation systems to control the front brake 60 and/or the rear brake 62, and/or gear shifting systems to control the drivetrain 58. Other control systems may also be included. For example, the system may be applied, in some embodiments, to a bicycle where only a front or only a rear gear changer is used. Also, the one or more bicycle control devices may also include suspension and/or other control systems for the bicycle 50.

Figure 2:
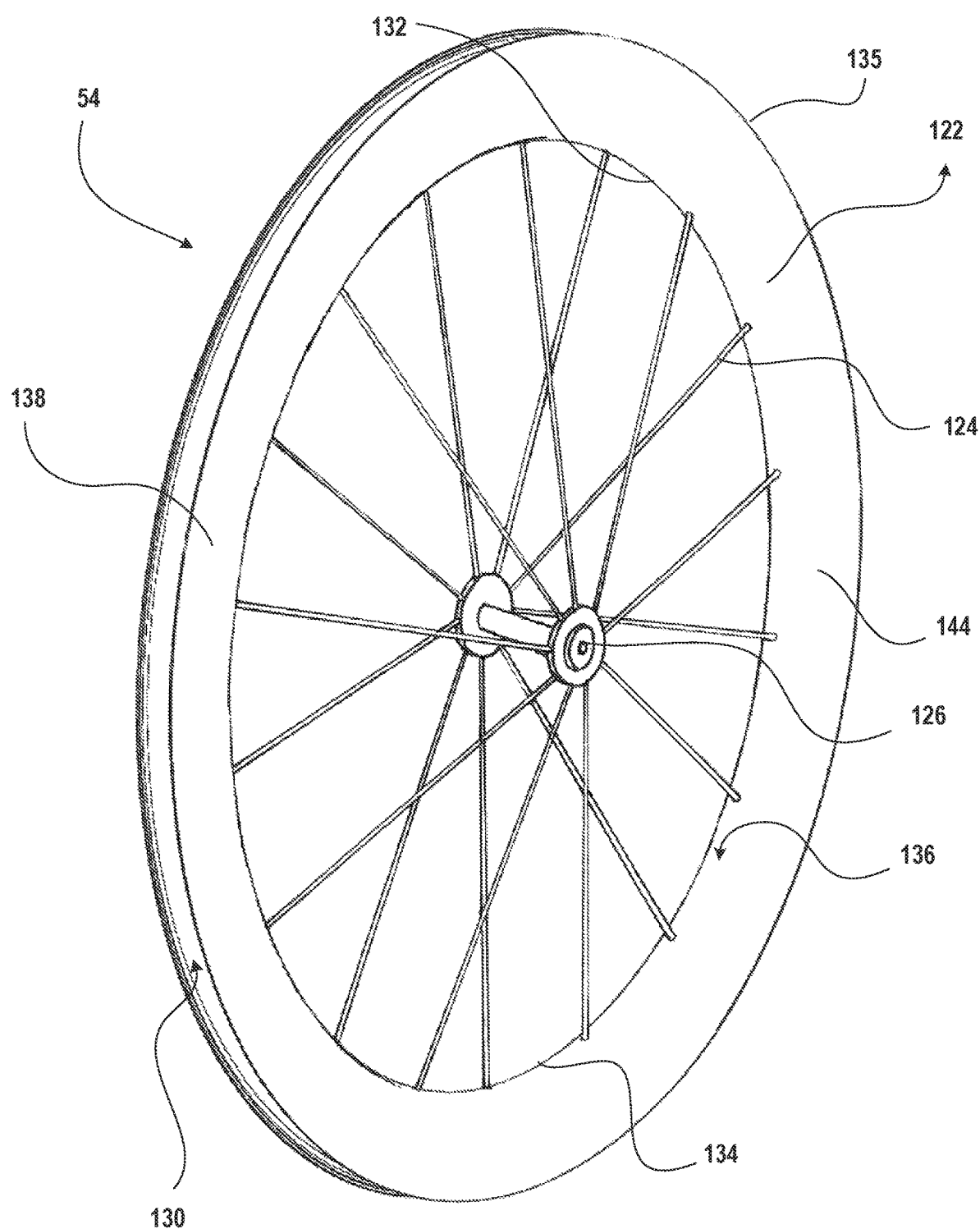
FIG. 2 is a perspective view of a wheel for a bicycle, such as the bicycle of FIG. 1, with a wheel cover installed.

The front wheel 54 and/or the rear wheel 56 of the bicycle 50 may include a tire 120 attached to a radially outer tire engaging portion of a rim 122. As shown in FIGS. 1 and 2, a plurality of spokes 124 are attached directly to the rim 122. Alternatively, the spokes 124 may be attached and/or secured to the rim 122 with other structural components. The spokes 124 extend from the rim 122 and attach to a central hub 126. The spokes 124 are maintained with a tension between the rim 122 and the central hub 126 to provide the respective wheel 54, 56 with an operational rigidity for use on the bicycle 50. The central hub 126 is configured for rotational attachment to the bicycle frame 52.

Figure 3:
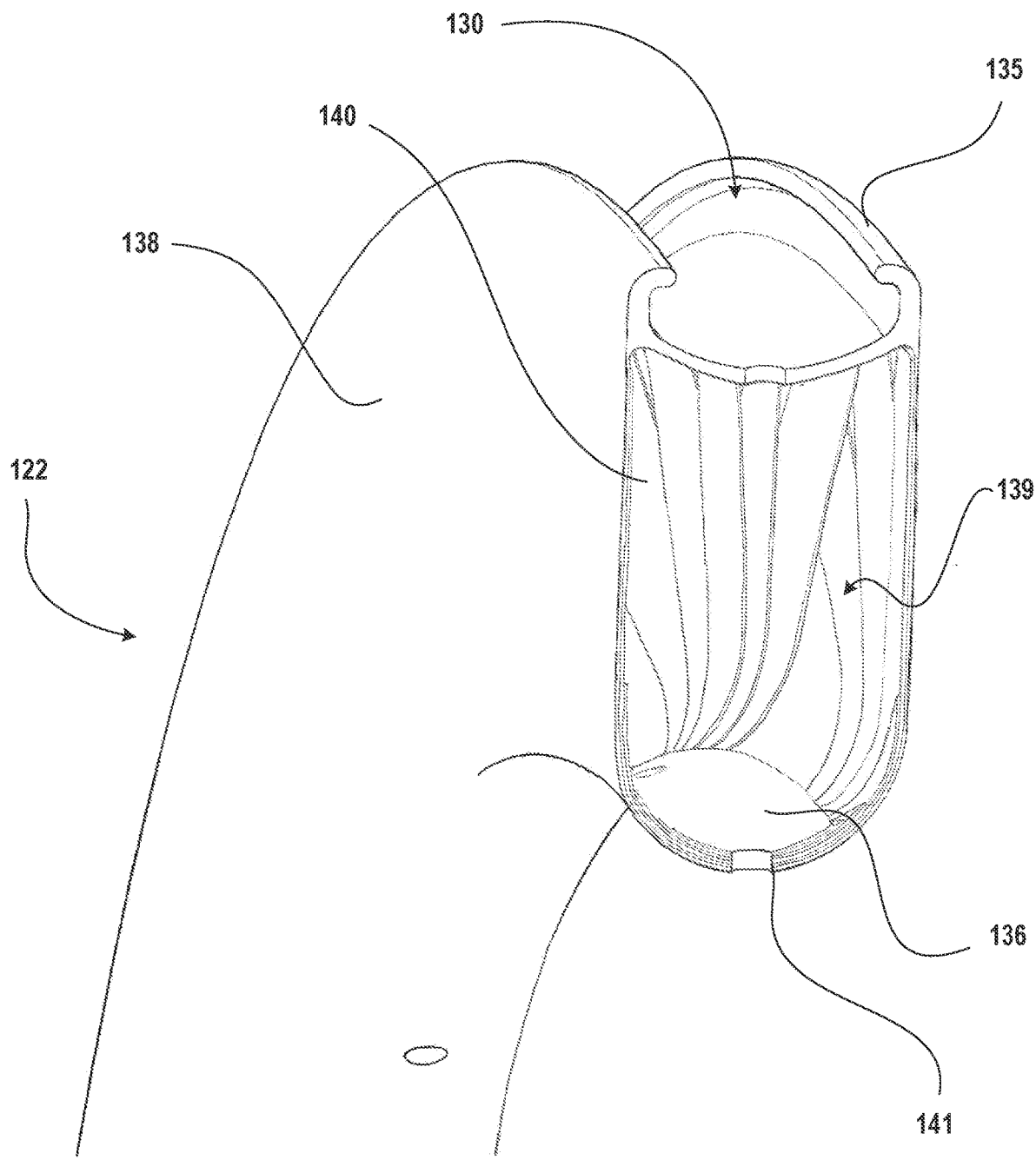
FIG. 3 is a perspective view of a cross-section of a rim for a bicycle, such as the bicycle of FIG. 1.

FIG. 2 illustrates a bicycle wheel having a rim 122, spokes 124, and a central hub 126, such as the front wheel 54 of FIG. 1, removed from the rest of the bicycle 50 and without a tire attached. Referring to FIGS. 2 and 3, the rim 122 includes a tire engaging portion 130 to engage with the tire 120, as is shown in FIG. 1. The tire engaging portion 130 is configured radially outward of a spoke receiving surface 132 that is disposed along an inner circumference 134 of the rim 122. In other words, the tire engaging portion 130 is a radially outer tire engaging portion. In an embodiment, the tire engaging portion 130 is disposed along an outer circumference 135 of the rim 122. The tire engaging portion 130 is configured for attachment to tires using clincher tire attachment configurations for tires including beaded interlock attachments. Other configurations of the tire engaging portion 130 may also be provided to allow for the use of other types of tires on the rim 122. For example, tubeless tires including beaded interlock attachment types may be used.

The rim 122 provides structure for attachment of the spokes 124 to the rim 122 at a receiving portion of the rim 122, proximate to the spoke receiving surface 132. As such, the spoke receiving surface 132 is part of a spoke engaging portion 136 (e.g., a radially inner portion) of the rim 122. In an embodiment, the spoke engaging portion 136 of the rim 122 is disposed along the inner circumference 134 of the rim 122. In another embodiment, the spoke receiving surface 132 and the spoke engaging portion 136 may be separate parts and/or portions of the rim 122. For example, the spokes 124 may pass through the spoke receiving surface 132, and the structure for attachment to the rim 122 may be provided proximate to the tire engaging portion 130.

The rim 122 includes a first sidewall 138 and a second sidewall that extend between the tire engaging portion 130 and the spoke engaging portion 136. For example, the first sidewall 138 and the second sidewall extend radially outward from the spoke engaging portion 136 to the tire engaging portion 130. The first sidewall 138 is spaced apart from the second sidewall.

At least part of the rim 122 (e.g., at least part of the spoke engaging portion 136 and/or at least part of the first sidewall 138 and the second sidewall) is formed by one or more composite materials (see FIG. 3). In one embodiment, the entire rim 122 is formed by carbon-fiber reinforced plastic. The rim 122 may, however, be formed of other materials and/or material combinations. In one example, carbon-fiber reinforced plastic forms a one-piece unitary rim of a singular collection of carbon-fiber layers including the tire engaging portion 130, the first sidewall 138, the second sidewall, and the spoke engaging portion 136. Other configurations may also be provided.

The front wheel 54 and the rear wheel 56 may include rims 122 configured for any size wheel. In an embodiment, the rims 122 are configured for use in wheels conforming to a 700 C (e.g. a 622 millimeter diameter clincher and/or International Standards Organization 622 mm) bicycle wheel standard.

The front wheel 54 and the rear wheel 56 may rotate about the central hub 126 in either direction. For example, as shown in FIG. 2, the front wheel 54 and the rear wheel 56 may be configured to rotate in a particular rotational direction about the central hub 126. In another example, the front wheel 54 and the rear wheel 56 may be configured to rotate in a direction opposite the particular rotational direction.

Referring to FIG. 3, the spoke engaging portion 136, the first sidewall 138, and the second sidewall of the front wheel 54 and/or the rear wheel 56 of the bicycle 50 (e.g., the front wheel 54 and the rear wheel 56 in the example FIG. 1) are at least partially formed by one or more stacks 139 of strips 140 of the one or more composite materials. The one or more stacks of 139 of strips 140 of the one or more composite materials are centered about one or more spoke holes 141 through the spoke engaging portion 136 of the rim 122, respectively. In one embodiment, the spoke engaging portion 136, the first sidewall 138, and the second sidewall of the front wheel 54 and the rear wheel 56 of the bicycle 50, respectively, are formed by the one or more stacks 139 of strips 140.

The one or more stacks 139 include fabric plies of the one or more composite materials that are shaped as strips. In one embodiment, for each of the front wheel 54 and the rear wheel 56, separate stacks 139 of strips 140 form the spoke engaging portion 136 and are positioned about respective spoke holes 141 corresponding to the spokes 124 of the respective wheel 54, 56. At least one strip 140 of each of the separate stacks 139 extends into and at least partially forms the first sidewall 138 and/or the second sidewall. In one embodiment, each strip 140 of the separate stacks 139 extends to the outer circumference 135 at the first sidewall 138 and the second sidewall, respectively. In another embodiment, one or more strips 140 of the separate stacks 139 extend past the outer circumference 135 at the first sidewall 138 and/or the second sidewall.

In a manufacturing process, the strips 140 of the front wheel 54 and the rear wheel 56, respectively, are integrated with the tire engaging portion 130 of the respective wheel 54, 56 by, for example, a curing process, such that a one-piece unitary rim 122 is formed. The rims 122 of the front wheel 54 and rear wheel 56, respectively, may be formed with other manufacturing processes.

The first sidewall 138 and the second sidewall of each of the front wheel 54 and the rear wheel 56 may include covers 144, respectively (See FIG. 2). The covers 144 may be provided for aerodynamics and to protect the respective wheel 54, 56 from debris. The covers 144 may be made of the same composite material as the first sidewall 138 and the second sidewall of the respective wheel 54, 56, or may be made of a different material than the first sidewall 138 and the second sidewall of the respective wheel 54, 56. The covers 144 may be part of one-piece unitary rims 122 and may be integrated within the respective rim 122 during, for example, the curing process. In one embodiment, the covers 144 are separate parts from the one-piece unitary rims 122 and are connected to the rims 122 in any number of ways including, for example, with one or more connectors. In other embodiments, the front wheel 54 and/or the rear wheel 56 does not include covers 144.

Figure 4:
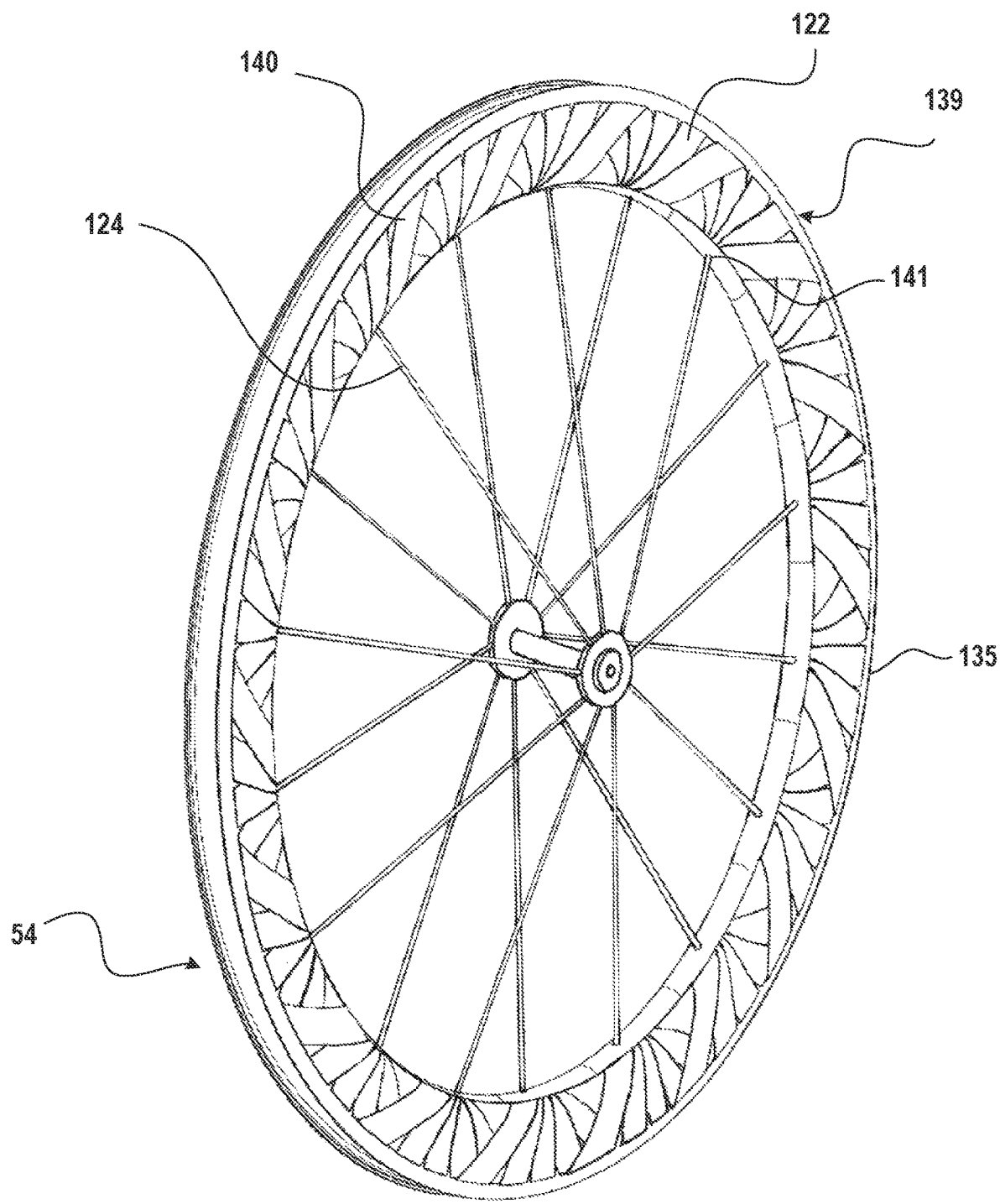
FIG. 4 is a perspective view of a wheel for a bicycle, such as the bicycle of FIG. 1, with the wheel cover removed.
Figure 5:
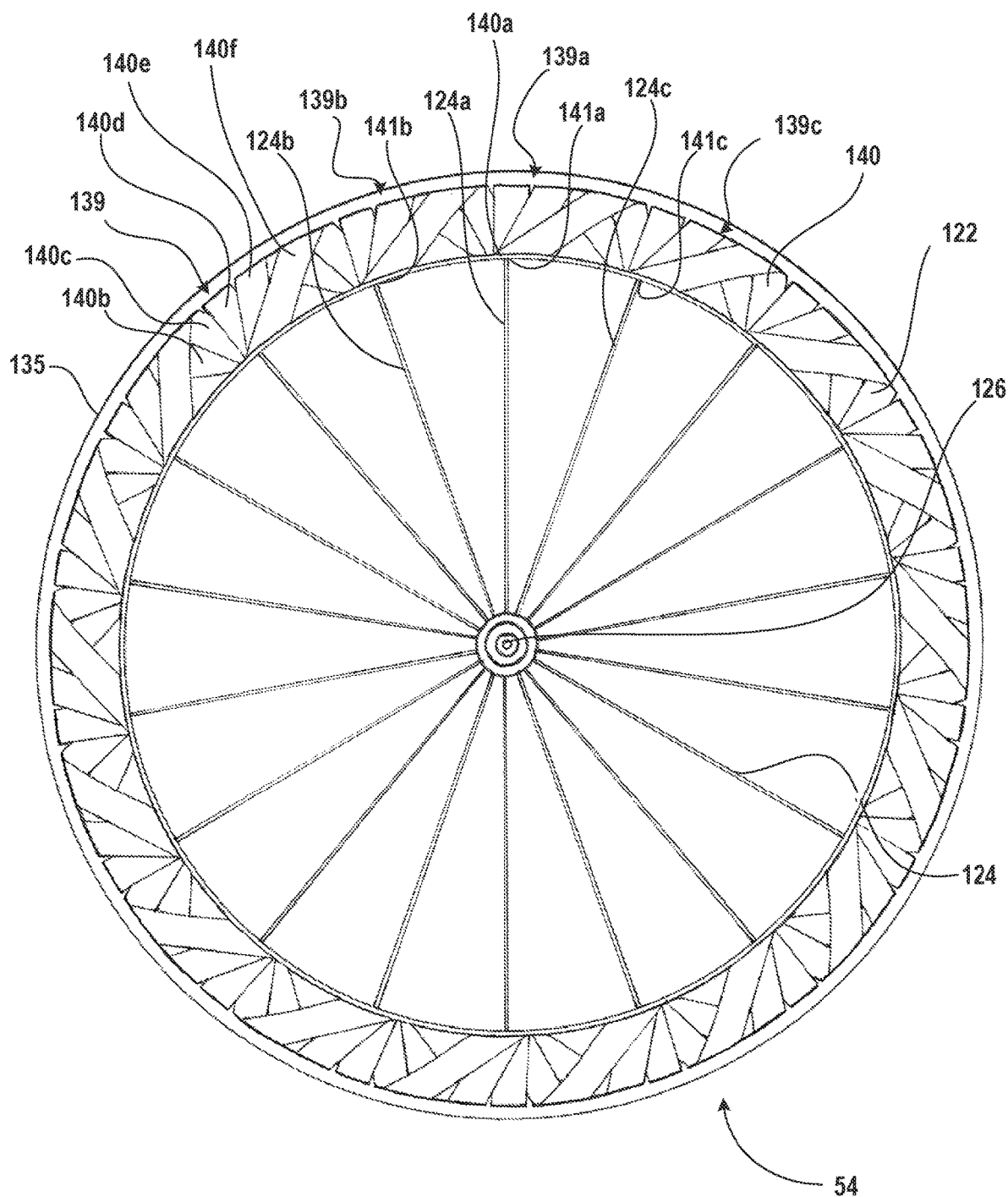
FIG. 5 is a side view of the wheel of FIG. 4.
Figure 6:
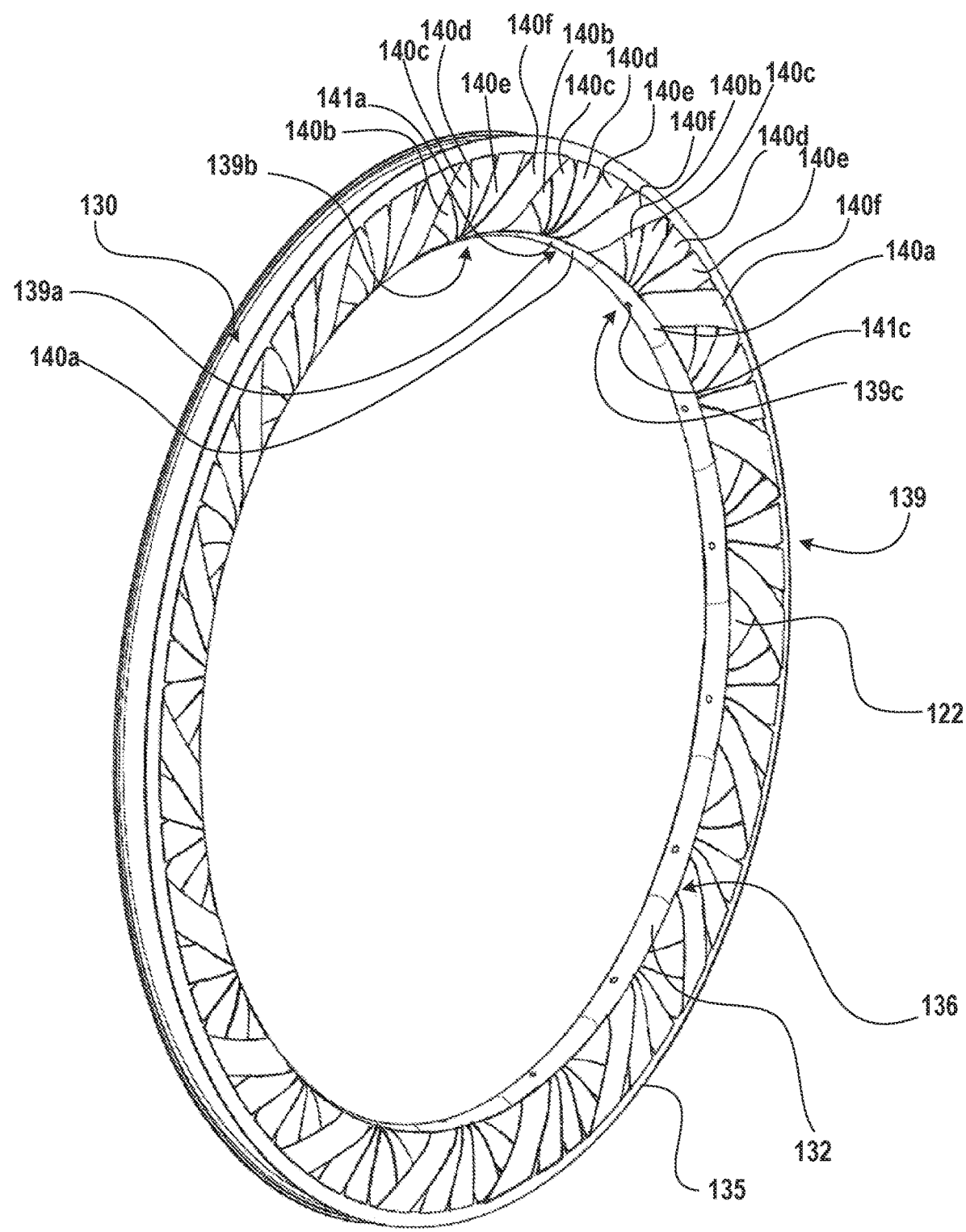
FIG. 6 is a perspective view of a rim for a wheel, such as the wheel of FIG. 4.

FIGS. 4-6 illustrate one embodiment of a rim 122 that includes eighteen stacks 139 of strips 140 positioned around the rim 122. Rims 122 may include more or fewer stacks 139 of strips 140. For example, a stack 139 may be positioned to correspond with every other spoke 124, not every spoke 124. Each of the eighteen stacks 139 of strips 140 includes a group of strips 140 fanned out about a respective spoke 124 extending through the respective stack 139 of strips 140. In other words, each of the strips 140 within the respective group of strips 140 is nonparallel to the other strips 140 of the group of strips 140 (e.g., centerlines of the strips 140 within the group are nonparallel to each other). In one embodiment, the respective spoke hole 141 is centered relative to each strip 140 of the respective stack 139. In another embodiment, for each strip 140 of the respective stack 139, the respective spoke hole 141 is centered relative to the widths of the strips 140 or is centered relative to the lengths of the strips 140. In other embodiments, for at least some of the strips 140 of the respective stack 139, the respective spoke hole 141 is not centered relative to the width of the strip 140 or relative to the length of the strip 140.

In the example shown in FIGS. 4-6, each of the eighteen stacks 139 of strips 140 includes six strips 140. In other embodiments, at least some of the stacks 139 of strips 140 may include more or fewer strips 140. Each of the stacks 139 of strips 140 partially overlaps at least one adjacent stack 139 of strips 140. For example, the eighteen stacks 139 of strips 140 include: a first stack 139a of strips 140 with a first spoke 124a extending through a first spoke hole 141a through the first stack 139a of strips 140; a second stack 139b of strips 140 with a second spoke 124b extending through a second spoke hole 141b through the second stack 139b of strips 140; and a third stack 139c of strips 140 with a third spoke 124c extending through a third spoke hole 141c through the third stack 139c of strips 140. At least the first stack 139a of strips 140, the second stack 139b of strips 140, and the third stack 139c of strips 140 (e.g., all of the stacks 139 of strips 140) each include a first strip 140a, a second strip 140b, a third strip 140c, a fourth strip 140d, a fifth strip 140e, and a sixth strip 140f. The first strips 140a of the first stack 139a of strips 140, the second stack 139b of strips 140, and the third stack 139c of strips 140 are adjacent to each other or overlap, and partially form the spoke engaging portion 136 of the rim 122.

As an example, the first strip 140a of the first stack 139a abuts, on opposite ends, the first strip 140a of the second stack 139b and the first strip 140a of the third stack 139c, respectively. Other overlapping may be provided. For example, the first strip 140a of the second stack 139b overlaps the first strip 140a of the first stack 139a, and the first strip 140a of the first stack 139a overlaps the first strip 140a of the third stack 139c. The pattern is repeated to form the spoke receiving surface 132 of the rim 122.

The strips 140 of each of the stacks 139 extend from the respective spoke hole 141 towards the tire engaging portion 130 at the first sidewall 138 and the second sidewall, respectively. At least some of the strips 140 may extend to the outer circumference 135 of the rim 122, beyond the outer circumference 135 of the rim 122, or short of the outer circumference 135 of the rim. In one embodiment, less than all of the strips 140 extend beyond the outer circumference 135 of the rim 122.

The strips 140 of each of the stacks 139 extending into the first sidewall 138 and the second sidewall provide that the strips 140 at least partially form the first sidewall 138 and the second sidewall. Adjacent stacks 139 of strips 140 overlap to strengthen the rim 122 at the first sidewall 136 and the second sidewall, respectively. For example, the sixth strip 140f of the first stack 139a partially overlaps at least one strip 140 of the third stack 139c. Referring to the example shown in FIGS. 5 and 6, the sixth strip 140f of the first stack 139a partially overlaps the second strip 140b and the third strip 140c of the third stack 139c. In other embodiments, the sixth strip 140f of the first stack 139a partially overlaps additional or fewer strips 140 of the third stack 139c, and/or other strips 140 of the first stack 139a partially overlap strips 140 of the third stack 139c.

The sixth strip 140f of the second stack 139b partially overlaps at least one strip 140 of the first stack 139a. Referring to the example shown in FIG. 5, the sixth strip 140f of the second stack 139b partially overlaps the second strip 140b and the third strip 140c of the first stack 139a. In other embodiments, the sixth strip 140f of the second stack 139b partially overlaps additional or fewer strips 140 of the first stack 139a, and/or other strips 140 of the second stack 139b partially overlap strips 140 of the first stack 139a. The overlapping pattern is repeated around the rim 122.

Figure 7:
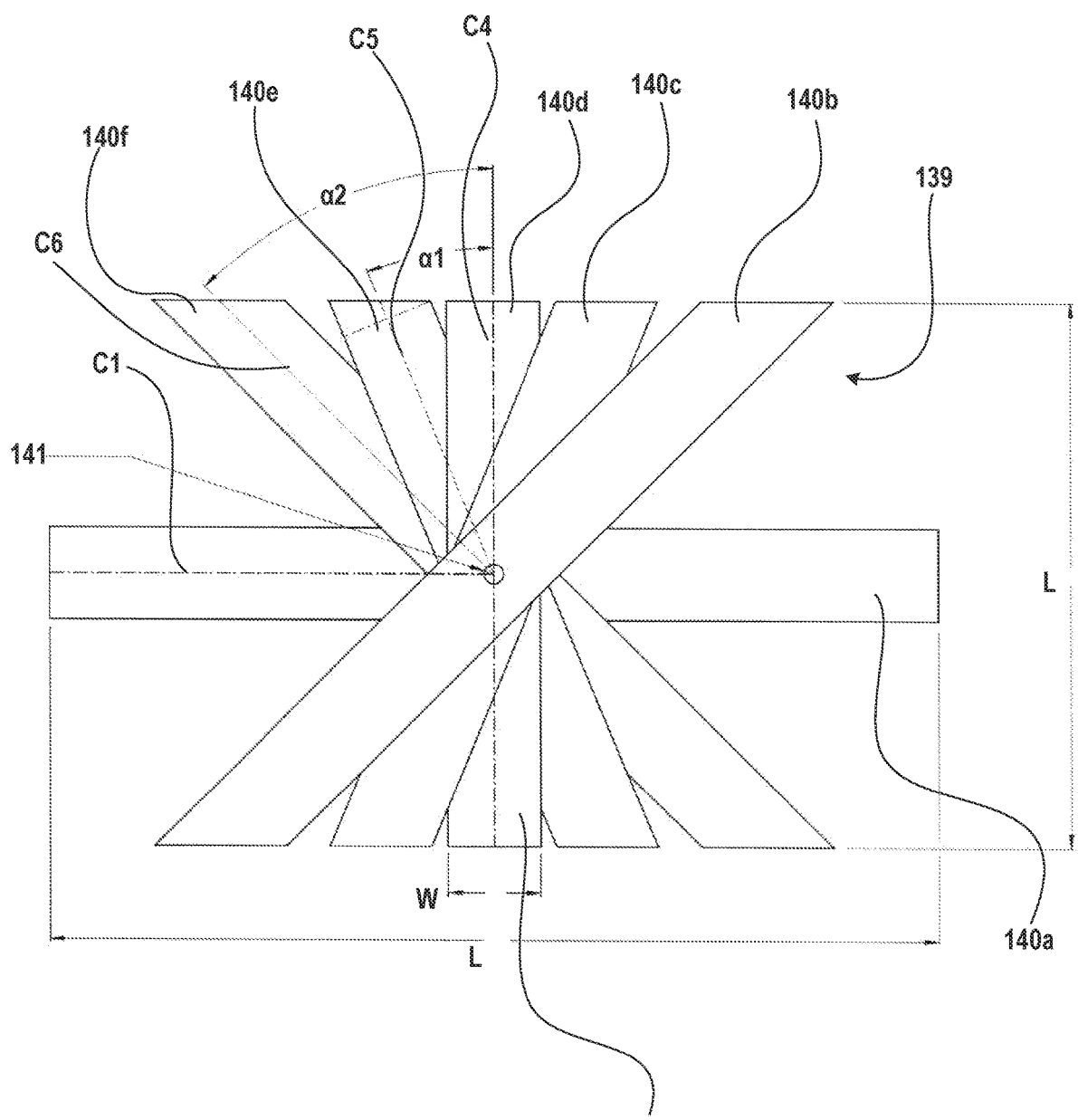
FIG. 7 is a top view of a first layup pattern of strips for a portion of the rim of FIG. 6.

FIG. 7 illustrates an exemplary layup pattern for an uncured stack 139 (e.g., the first stack 139a) of strips 140 that partially forms one embodiment of the rim 122. The first strip 140a, which partially forms the spoke receiving surface 132 of the rim 122, is positioned on the bottom of the first stack 139a, for example, and the sixth strip 140f is positioned on top of the first strip 140a. The fifth strip 140e is positioned on top of the sixth strip 140f, and the fourth strip 140d is positioned on top of the fifth strip 140. The third strip 140c is positioned on top of the fourth strip 140d, and the second strip 140b is positioned on top of the third strip 140c. The strips 140 are fanned out relative to each other, about the respective spoke hole 141. The strips 140 may be positioned at any number of angles relative to each other. The strips 140 are, for example, nonparallel relative to each other.

For example, the first strip 140a has a centerline C1, the fourth strip 140d has a centerline C4, the fifth strip 140e has a centerline C5, and the sixth strip 140f has a centerline C6. The sixth strip 140f is angled relative to the first strip 140a, such that the centerline C6 of the sixth strip 140f is at a 45 degree angle relative to the centerline C1 of the first strip 140a, the fifth strip 140e is angled relative to the first strip 140a, such that the centerline C5 of the fifth strip 140e is at a 67.5 degree angle relative to the centerline C1 of the first strip 140a, and the fourth strip 140d is angled relative to the first strip 140a, such that the centerline C4 of the fourth strip 140d is at a 90 degree angle relative to the centerline C1 of the first strip 140a. In other words, the centerline C5 of the fifth strip 140e is at an angle $\alpha1$ of 22.5 degrees relative to the centerline C4 of the fourth strip 140d, and the centerline C6 of the sixth strip 140f is at an angle $\alpha2$ of 45 degrees relative to the centerline C4 of the fourth strip 140d.

The positioning of the third strip 140c and the second strip 140b is symmetrical to the positioning of the fifth strip 140e and the sixth strip 140f, respectively, about the centerline C4 of the fourth strip 140d (e.g., a centerline of the second strip 140b is at a 45 degree angle relative to the centerline C1 of the first strip 140a, and a centerline of the third strip 140c is at a 67.5 degree angle relative to the centerline C1 of the first strip 140a). Other positioning may be provided. For example, the centerline C6 of the sixth strip 140f may be at a 33.3 degree angle relative to the centerline C1 of the first strip 140a, the centerline C5 of the fifth strip 140e may be at a 66.6 degree angle relative to the centerline C1 of the first strip 140a, and the centerline C4 of the fourth strip 140d may be at a 90 degree angle relative to the centerline C1 of the first strip 140a. The positioning of the second strip 140b and the third strip 140c may again be symmetrical to the positioning of the sixth strip 140f and the fifth strip 140e, respectively, relative to the centerline C4 of the fourth strip 140d. Other angular positioning may be provided.

The strips 140 within a stack 139 may be any number of sizes, shapes, and/or materials. Each of the strips 140 within a stack 139 may have a same length L, a same width W, and/or may be made of a same material. Alternatively, at least two subsets of strips 140 within a stack 139 may have different lengths, different widths W, and/or may be made of different materials. In one embodiment, all strips 140 within one stack 139 may have a different length L, a different width W, and/or may be made of a different material than all strips 140 within another stack 139 (e.g., an adjacent stack 139 of strips 140).

Referring to FIG. 7, some of the strips 140 are shaped as non-rectangular parallelograms (e.g., the second strip 140b, the third strip 140c, the fifth strip 140e, and the sixth strip 140f), and two of the strips 140 are shaped as rectangles (e.g., the first strip 140a and the fourth strip 140d). The second strip 140b, the third strip 140c, the fifth strip 140e, and the sixth strip 140f, for example, are shaped as parallelograms so that when the strips 140 of the stack 139 are wrapped up and towards the tire engaging portion 130, at least partially forming the first sidewall 138 and the second sidewall, material of the strips 140 does not extend beyond the outer circumference 135 of the rim 122. In one embodiment, all of the strips 140 of the stack 139 are rectangular. In other embodiments, one or more of the strips 140 of the stack 139 are shapes other than parallelograms.

Figure 8:
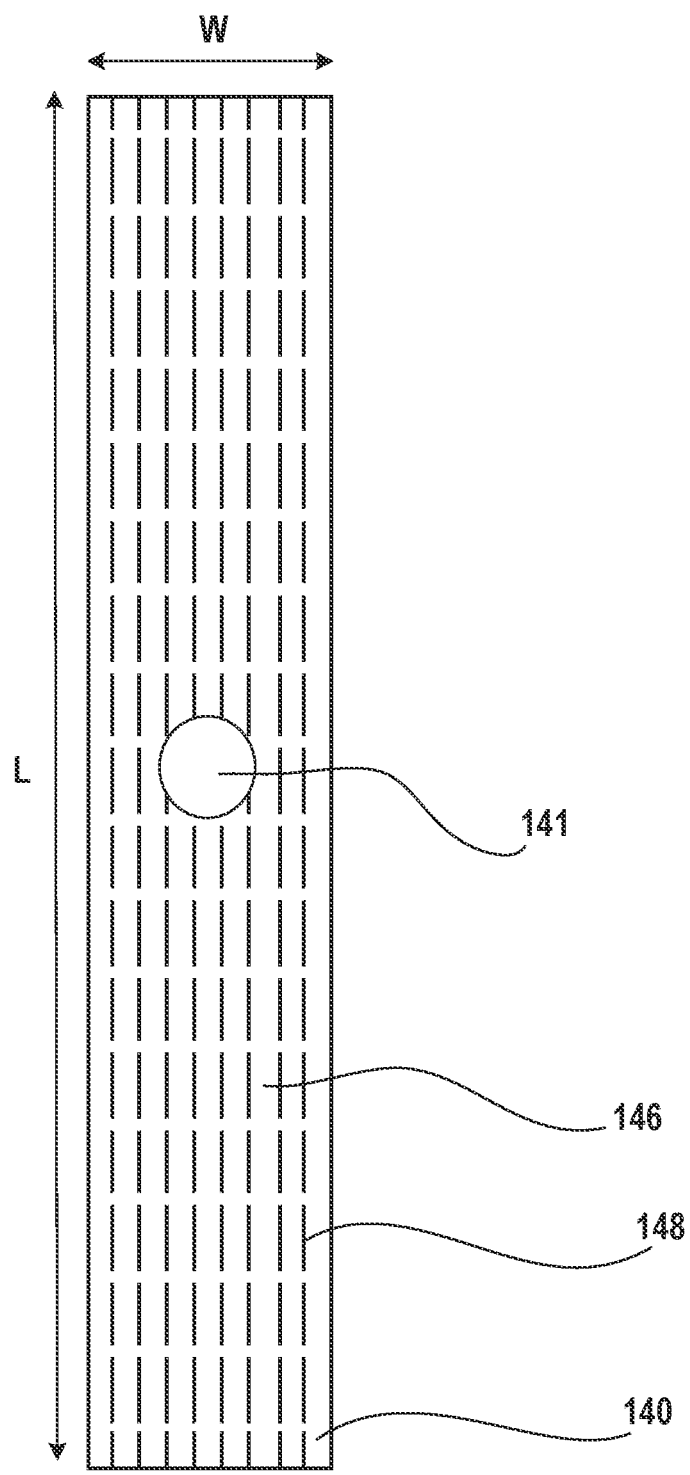
FIG. 8 is a side view of one of the strips of FIG. 7.

FIG. 8 illustrates one embodiment of a strip 140 of the composite material. The composite material includes a matrix 146 of a polymer-based material and fibers 148 of a reinforcing material. The polymer-based material may be any number of materials including, for example, a plastic, an acrylic, a resin, an epoxy, another polymer-based material, or any combination thereof. The fibers of the reinforcing material may be carbon fibers. Other polymer-based materials and/or other reinforcing fibers may be used.

The fibers 148 extend along a finite length L of the strip 140. The strip 140 includes the spoke hole 141, and the fibers 148 extend along the finite length L of the strip 140 tangential or adjacent to the spoke hole 141. In one embodiment, the fibers 148 extend in a primary strength direction of the strip 140 (e.g., along the length L of the strip 140). For example, the strip 140 has unidirectional fiber orientation along the length L. The strips 140, for example, provide ultimate strength in a direction of fiber grain. In one embodiment, a portion of the fibers 148 (e.g., one or more of the fibers; more than 75 percent of the fibers, more than 90 percent of the fibers, or more than 95 percent of the fibers) within a strip 140 extend along the finite length L. In another embodiment, all of the fibers 148 substantially extend along the finite length L (e.g., within 3 degrees of a line parallel to the centerline of the strip 140, which is parallel to the length L of the strip 140).

The strip 140 may be any number of shapes and/or sizes. For example, the strip 140 is shaped as a parallelogram (e.g., rectangular or as a non-rectangular parallelogram). Other shapes (e.g., square shaped) may be provided. The strip 140 also includes a width W that is perpendicular to the length L. The strip 140 may be any number of different lengths L and widths W. The length L may be defined by a size of, for example, the spoke engaging portion 136, and the first sidewall 138 and/or the second sidewall of the rim 122. In one embodiment, the width W of the strip 140 is between 10 mm and 30 mm. For example, the width W of the strip 140 is 20 mm. In other embodiments, the strip 140 is wider or narrower. Smaller strip widths better optimize fiber orientation but come with a cost of added manufacturing complexity. In one embodiment, at least one strip 140 within a stack 139 has a different length L and/or a different width W than another strip 140 within the same stack 139. In another embodiment, every strip 140 within a stack 139 has a different length L and a different W than every other strip 140 within the stack 139. The different strip lengths L and/or widths W within a stack 139 may apply to one or more stacks 139 (e.g., all stacks 139) within the rim 122.

Figure 9:
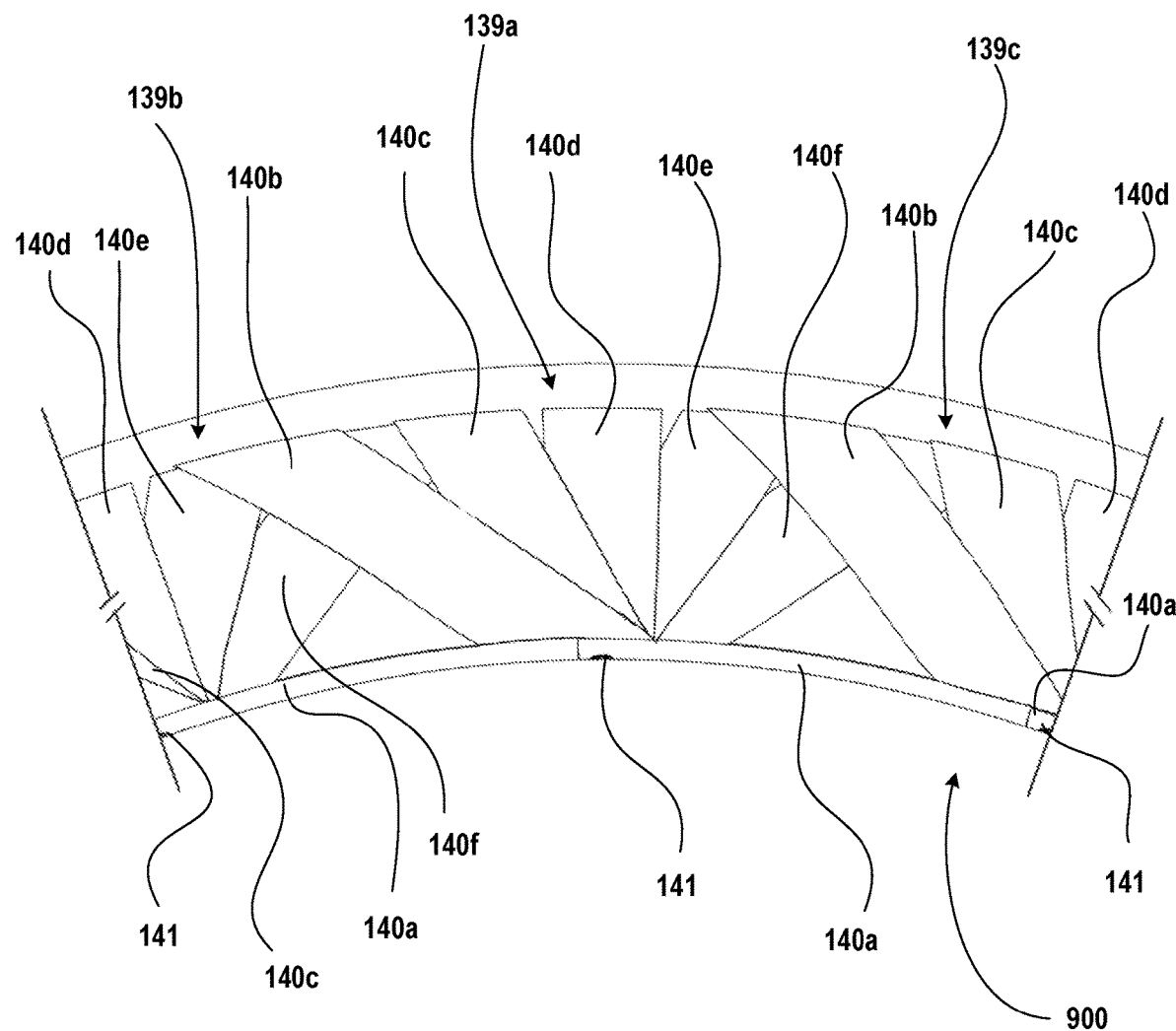
FIG. 9 is a close-up side view of a composite rim formed by strips positioned in a second layup pattern.

Other positioning and overlapping of adjacent stacks 139 of strips 140 and/or other relative positioning of strips 140 within individual stacks 139 may be provided. Referring to rim 900 of FIG. 9, the second strip 140b of the first stack 139a, for example, partially overlaps the fifth strip 140e and the sixth strip 140f of the second stack 139b, the third strip 140c of the first stack 139a partially overlaps the sixth strip 140f of the second stack 139b, the second strip 140b of the third stack 139c partially overlaps the fifth strip 140e and the sixth strip 140f of the first stack 139a, and the third strip 140c of the third stack 139c partially overlaps the sixth strip 140f of the first stack 139a. The ordering of the strips 140 within each stack 139 is different compared to the example shown in FIGS. 4-7, as the second strip 140b is positioned on the first strip 140a, the third strip 140c is positioned on the second strip 140b, the fourth strip 140d is positioned on the third strip 140c, the fifth strip 140e is positioned on the fourth strip 140d, and the sixth strip 140f is positioned on the fifth strip 140e. Additionally, each of the spoke holes 141 extends through the first strip 140a of the respective stack 139 adjacent to one end of the first strip 140a. In other words, the spoke holes 141 are not centered relative to the first strips 140a, respectively (e.g., with respect to the length of the first strip 140a).

Figure 10:
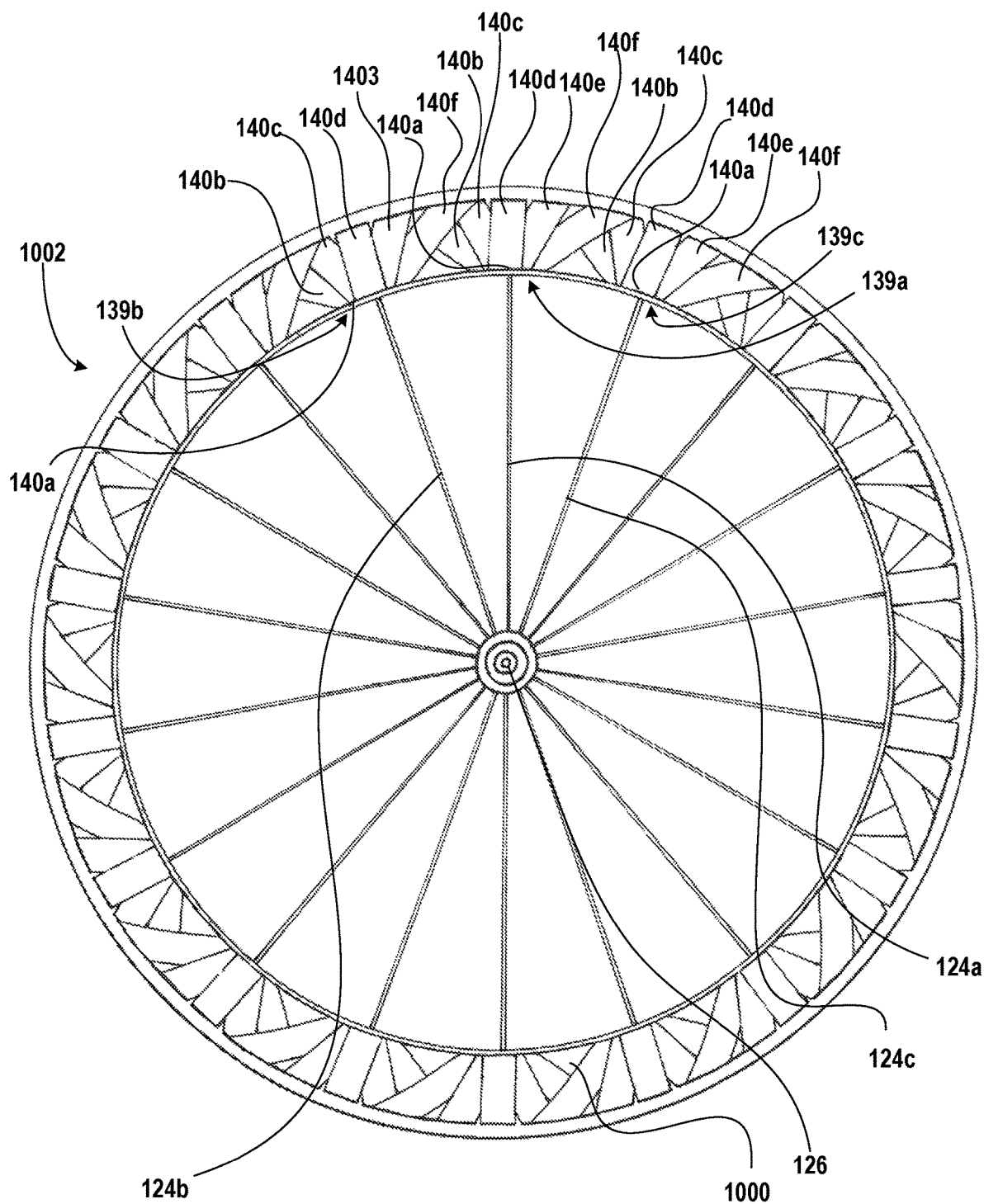
FIG. 10 is a side view of a wheel for a bicycle, such as the bicycle of FIG. 1, including a composite rim formed by strips positioned in a third layup pattern.

As another example, referring to rim 1000 of front wheel 1002 of FIG. 10, the sixth strip 140f of the second stack 139b partially overlaps the second strip 140b and the third strip 140c of the first stack 139a, and the sixth strip 140f of the first stack 139a partially overlaps the second strip 140b and the third strip 140c of the third stack 139c. The ordering of the strips 140 within each stack 139 is different compared to the examples shown in FIGS. 4-7 and 9, respectively, as the fourth strip 140d is positioned on the first strip 140a. One of the third strip 140c and the fifth strip 140e is positioned on the fourth strip 140d, and the other of the third strip 140c and the fifth strip 140e is positioned on the stack 139 next. One of the second strip 140b and the sixth strip 140f is positioned on the stack 139 next, and the other of the second strip 140b and the sixth strip 140f follows.

Figure 11:
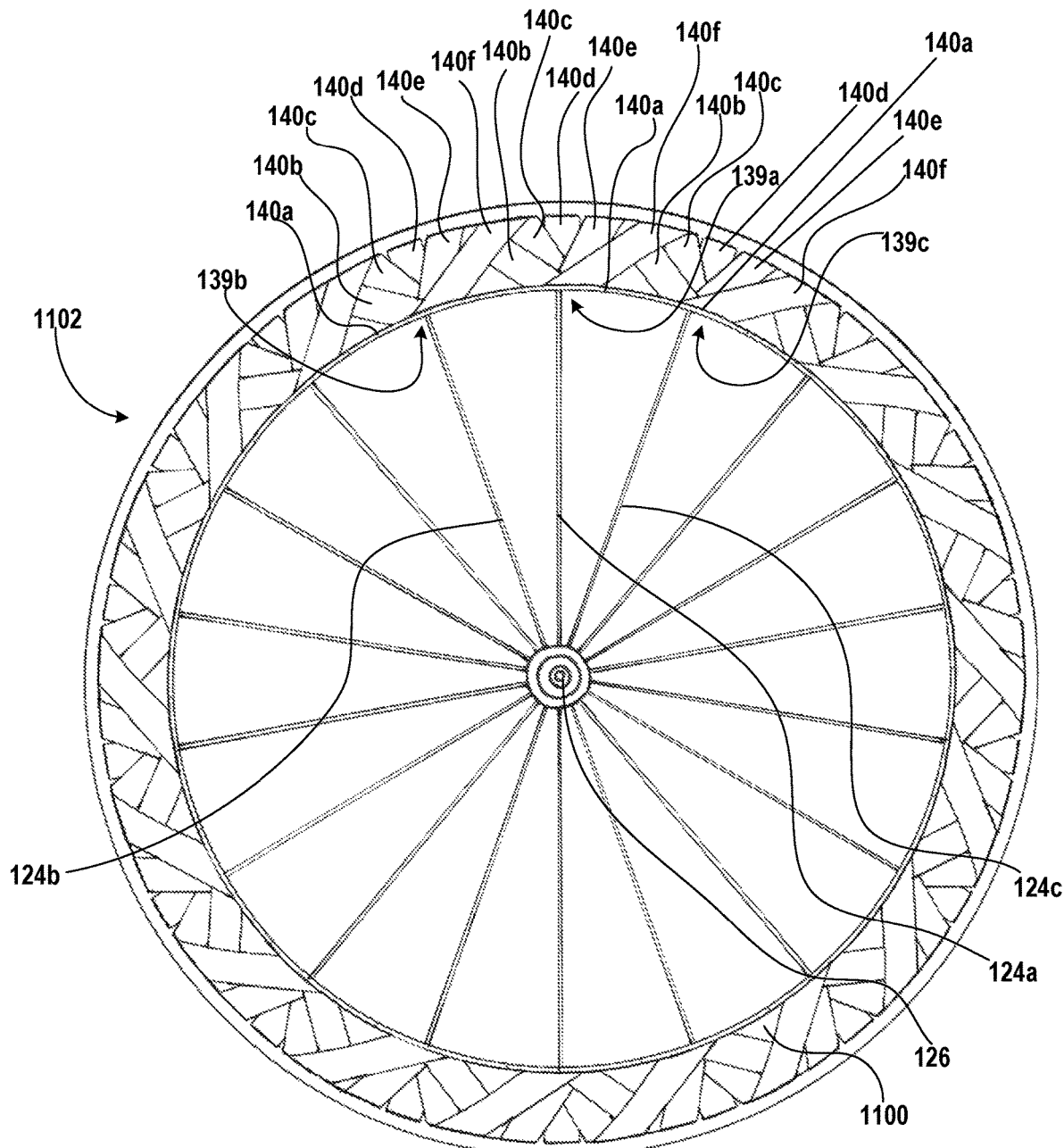
FIG. 11 is a side view of a wheel for a bicycle, such as the bicycle of FIG. 1, including a composite rim formed by strips positioned in a fourth layup pattern.

As another example, referring to rim 1100 of front wheel 1102 of FIG. 11, the sixth strip 140f of the first stack 139a partially overlaps the second strip 140b and the third strip 140c of the third stack 139c, and the sixth strip 140f of the second stack 139b partially overlaps the second strip 140b and the third strip 140c of the first stack 139a. The ordering of the strips 140 within each stack 139 is different compared to the examples shown in FIGS. 4-7, FIG. 9, and FIG. 10, respectively, as the sixth strip 140f is positioned on the first strip 140a, the second strip 140b is positioned on the sixth strip 140f, the fifth strip 140e is positioned on the second strip 140b, the third strip 140c is positioned on the fifth strip 140e, and the fourth strip 140d is positioned on the third strip 140c.

Figure 12:
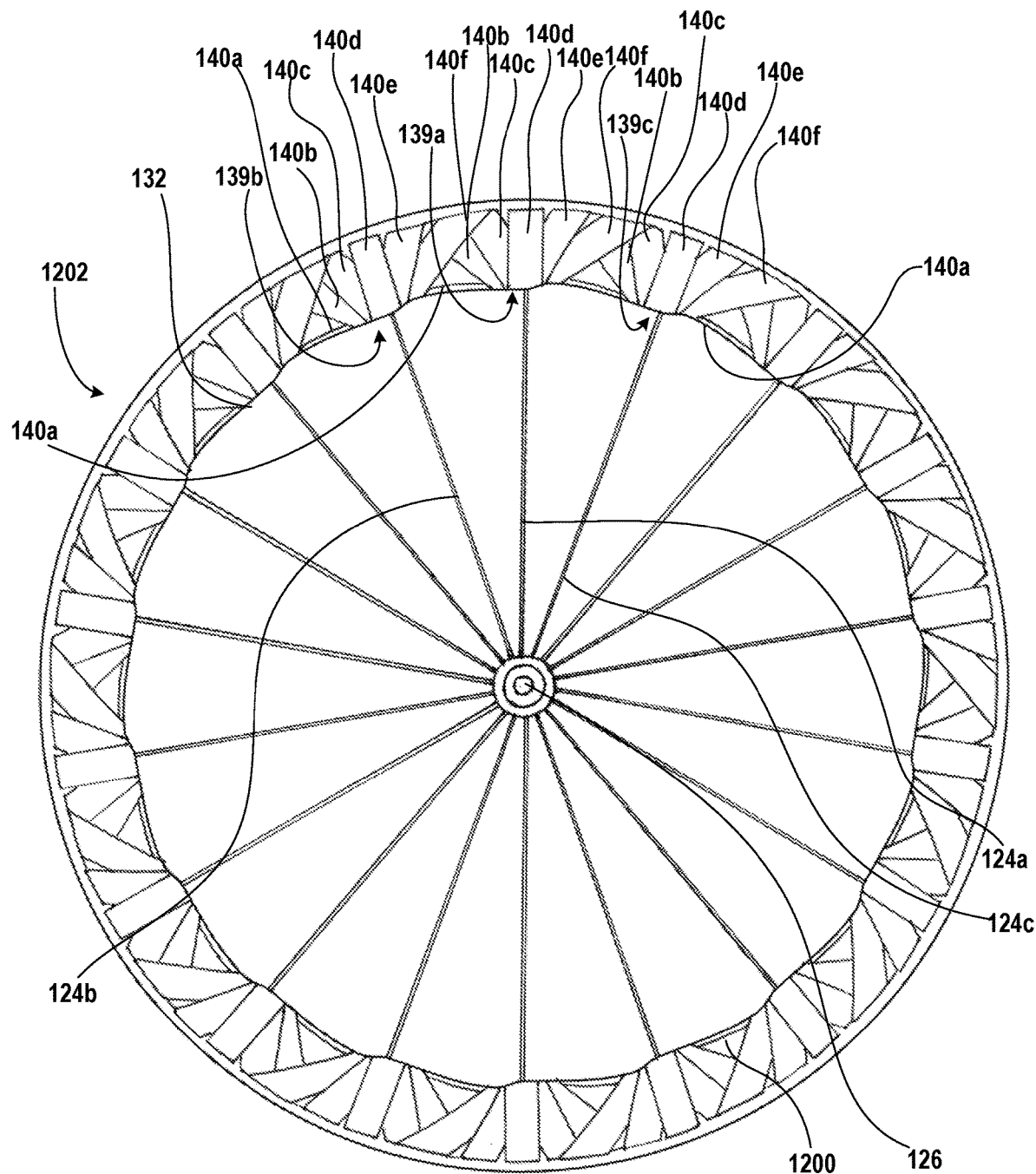
FIG. 12 is a side view of a wheel for a bicycle, such as the bicycle of FIG. 1, including a composite rim formed by strips positioned in a fifth layup pattern.

Additional strips 140, combined with the first strips 140a of the stacks 139, may define the inner circumference 134 of the rim. Referring to rim 1200 of front wheel 1202 of FIG. 12, the fourth strip 140d of each of the stacks 139 may be positioned on the bottom of the respective stack 139, and the first strip 140a of each of the stacks 139 may be positioned on the top of the respective stack 139. The stacks 139 may thus form a spoke receiving surface 132 with a varying radius, as the fourth strips 140d defines the spoke receiving surface 132 at and adjacent to each of the spoke holes 141, and the first strips 140a define the spoke receiving surface 132 between each of the stacks 139.

In other embodiments, nodal reinforcement may be provided at each spoke hole 141 location of the rim 122 with one or more layers of one or more composite materials at least partially forming the first sidewall 138 and the second sidewall. Each layer of the composite material includes fabric plies of the composite material that are shaped as strips 150. The strips 150 of the first sidewall 138 and the second sidewall of the front wheel 54 may be disposed about the central hub 126 of the front wheel 54, respectively, and the strips 150 of the first sidewall 138 and the second sidewall of the rear wheel 56 may be disposed about the central hub 126 of the rear wheel 56, respectively. In a manufacturing process, the strips 150 of the front wheel 54 and the rear wheel 56, respectively, are integrated with a separate spoke engaging portion 136 and a separate tire engaging portion 130 of the respective wheel 54, 56 by, for example, a curing process, such that a one-piece unitary rim 122 is formed. The rims 122 of the front wheel 54 and rear wheel 56, respectively, may be formed with other manufacturing processes.

Figure 13:
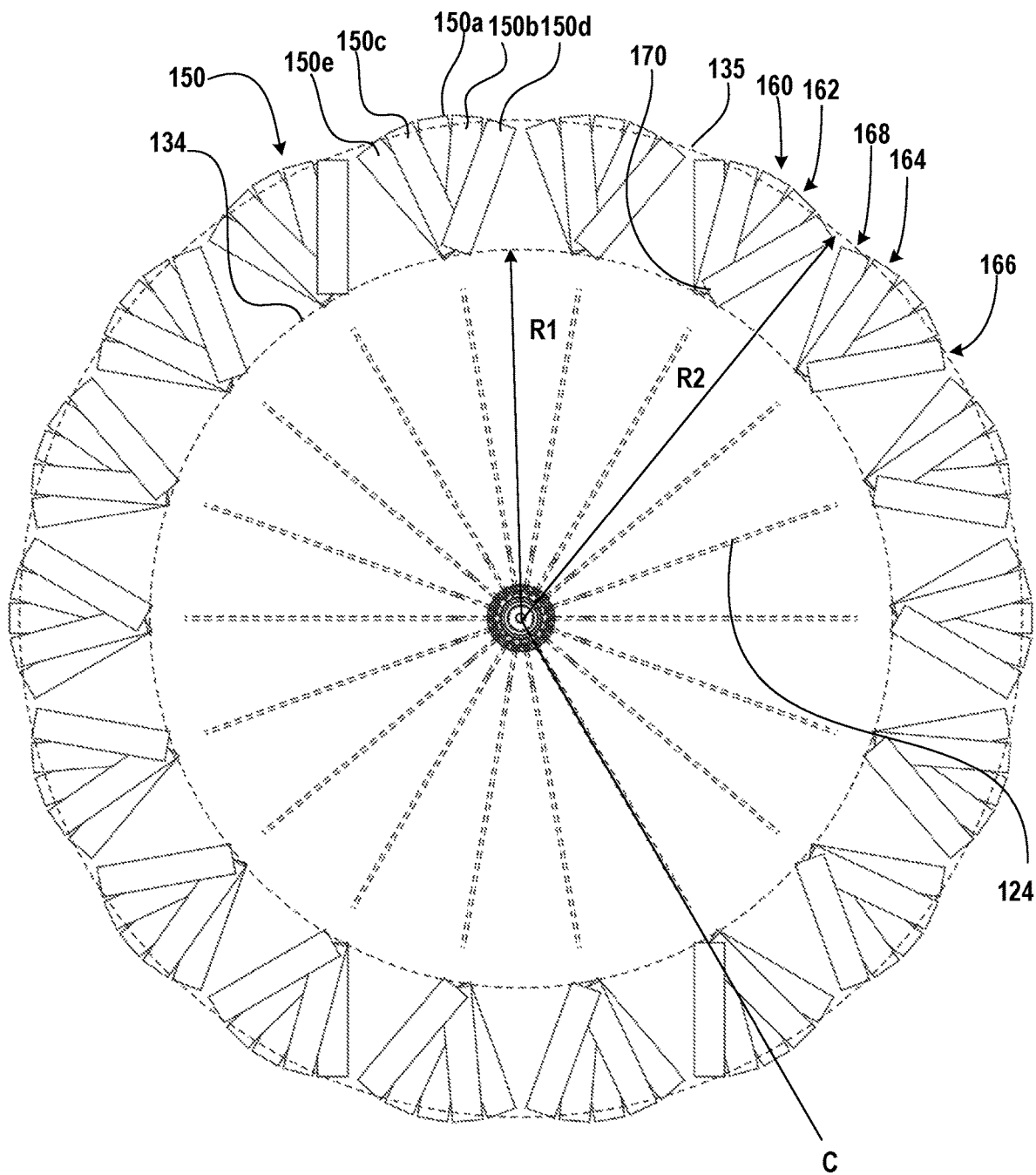
FIG. 13 is a side view of an uncured sidewall of a composite rim formed by strips positioned in a first woven pattern.
Figure 14:
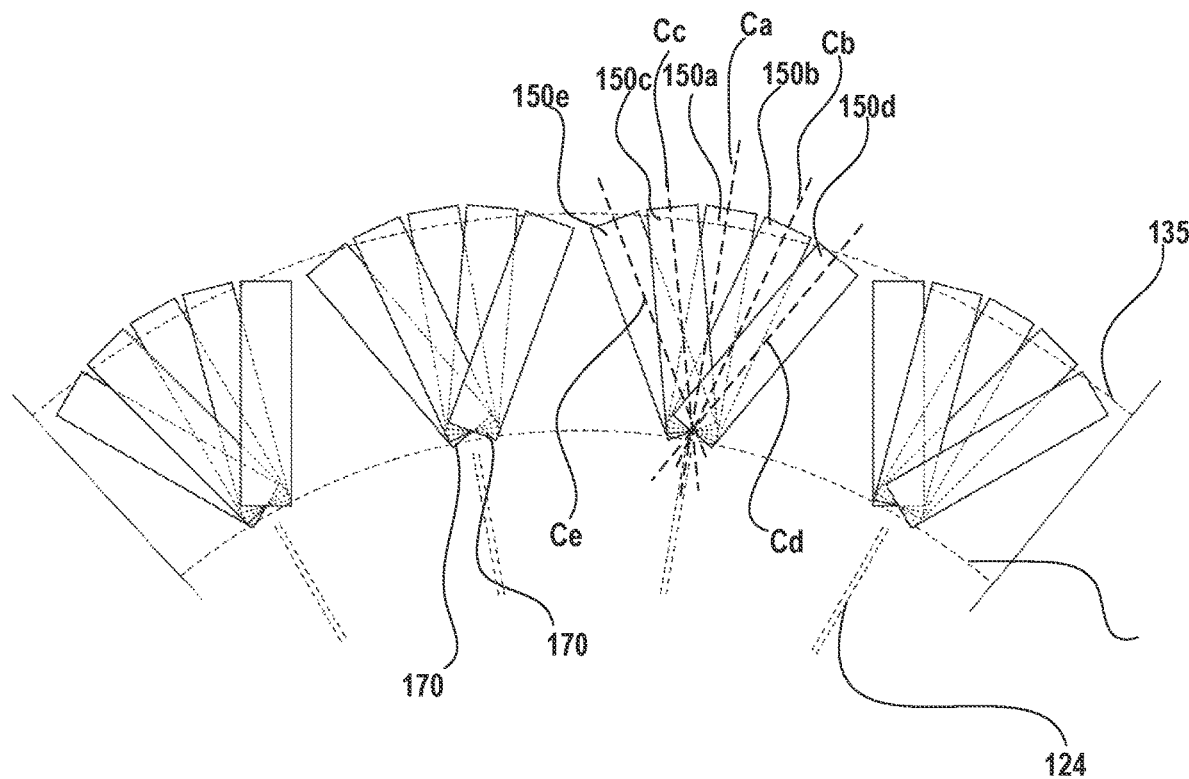
FIG. 14 is a close-up side view of the uncured sidewall of FIG. 13.

FIGS. 13 and 14 illustrate one embodiment of a layup pattern of strips 150 for the first sidewall 138 or the second sidewall prior to the curing process. The strips 150, after the curing process, may be part of a one-piece unitary rim 122. The layup pattern (e.g., for the first sidewall 138) includes a first layer 160 of the composite material, a second layer 162 of the composite material, a third layer 164 of the composite material, a fourth layer 166 of the composite material, and a fifth layer 168 of the composite material. The layup pattern may include more or fewer layers of the composite material.

The first layer 160, the second layer 162, the third layer 164, the fourth layer 166, and the fifth layer 168 of the composite material include fabric plies (e.g., the strips 150). In other embodiments, one or more strips 150 of the first layer 160, the second layer 162, the third layer 164, the fourth layer 166, and/or the fifth layer 168 are made of one or more materials different than the composite material (e.g., another composite material).

The layup pattern for the first sidewall 138, for example, prior to the curing process, is circular in shape. The strips 150 are arranged around a center C, between an inner circumference of the layup pattern defined by a first radius R1 and an outer circumference of the layup pattern defined by a second radius R2. The inner circumference and the outer circumference of the layup pattern may, for example, define the inner circumference 134 of the rim 122 and the outer circumference 135 of the rim 122, respectively. Alternatively, the spoke engaging portion 136 and the tire engaging portion 130 may define the inner circumference 134 of the rim 122 and the outer circumference 135 of the rim 122, respectively. Referring to FIGS. 13 and 14, the strips 150 may extend beyond the second radius R2, and the material extending beyond the second radius R2 may not be removed, such that the outer circumference 135 of the rim 122 has a variable radius. The first sidewall 138 may include any number of strips 150. For example, the first sidewall 138 may include 90 strips 150. More or fewer strips 150 may be included within the first sidewall 138 depending on a size and/or a shape of the strips 150, and/or a size of the rim 122.

The first layer 160, the second layer 162, the third layer 164, the fourth layer 166, and the fifth layer 168 of the composite material form a woven layup pattern that is aligned with the spokes 124 of the rim 122. The first layer 160 includes first strips 150a, the second layer 162 includes second strips 150b, the third layer 164 includes third strips 150c, the fourth layer 166 includes fourth strips 150d, and the fifth layer 168 include fifth strips 150e. Referring to FIG. 14, centerlines Ca of the first strips 150a of the first layer 160 are aligned with the spokes 124 of the rim 122, respectively. For each first strip 150a aligned with a spoke 124, a second strip 150b of the second layer 162, a third strip 150c of the third layer 164, a fourth strip 150d of the fourth layer 166, and a fifth strip 150e of the fifth layer 168 overlap and are angled relative to the respective first strip 150a. For example, the second strips 150b and the third strips 150c are positioned relative to the first strips 150a, respectively, such that centerlines Cb of the second strips 150b and centerlines Cc of the third strips 150c are at 15 degree angles and −15 degree angles relative to the centerlines Ca of the first strips 150a, respectively. The fourth strips 150d and the fifth strips 150e are positioned relative to the first strips 150a, respectively, such that centerlines Cd of the fourth strips 150d and centerlines Ce of the fifth strips 150e are at 30 degree angles and −30 degree angles relative to the centerlines Ca of the first strips 150a, respectively. Other angular positioning of the strips 150 may be provided.

The layup pattern is a woven layup pattern in that the strips 150 aligned with a respective spoke 124 overlap at and/or adjacent to ends 170 of the strips 150, respectively. For example, for the strips 150 aligned with a respective spoke 124: at least a portion of the end 170 of the second strip 150b of the second layer 162 overlaps the first strip 150a of the first layer 160; at least a portion of the end 170 of the fifth strip 150e of the fifth layer 168 overlaps the second strip 150b; at least a portion of the end 170 of the third strip 150c of the third layer 164 overlaps the fifth strip 150e; and at least a portion of the end 170 of the fourth strip 150d of the fourth layer 166 overlaps the third strip 150c. The positioning of the first layer 160, the second layer 162, the third layer 164, the fourth layer 166, and the fifth layer 168 provides a fan-like arrangements of strips 150 aligned with each of the spokes 124 of the rim 122, respectively, to provide nodal support in line with the spokes 124. Other woven patterns may be provided.

Figure 15:
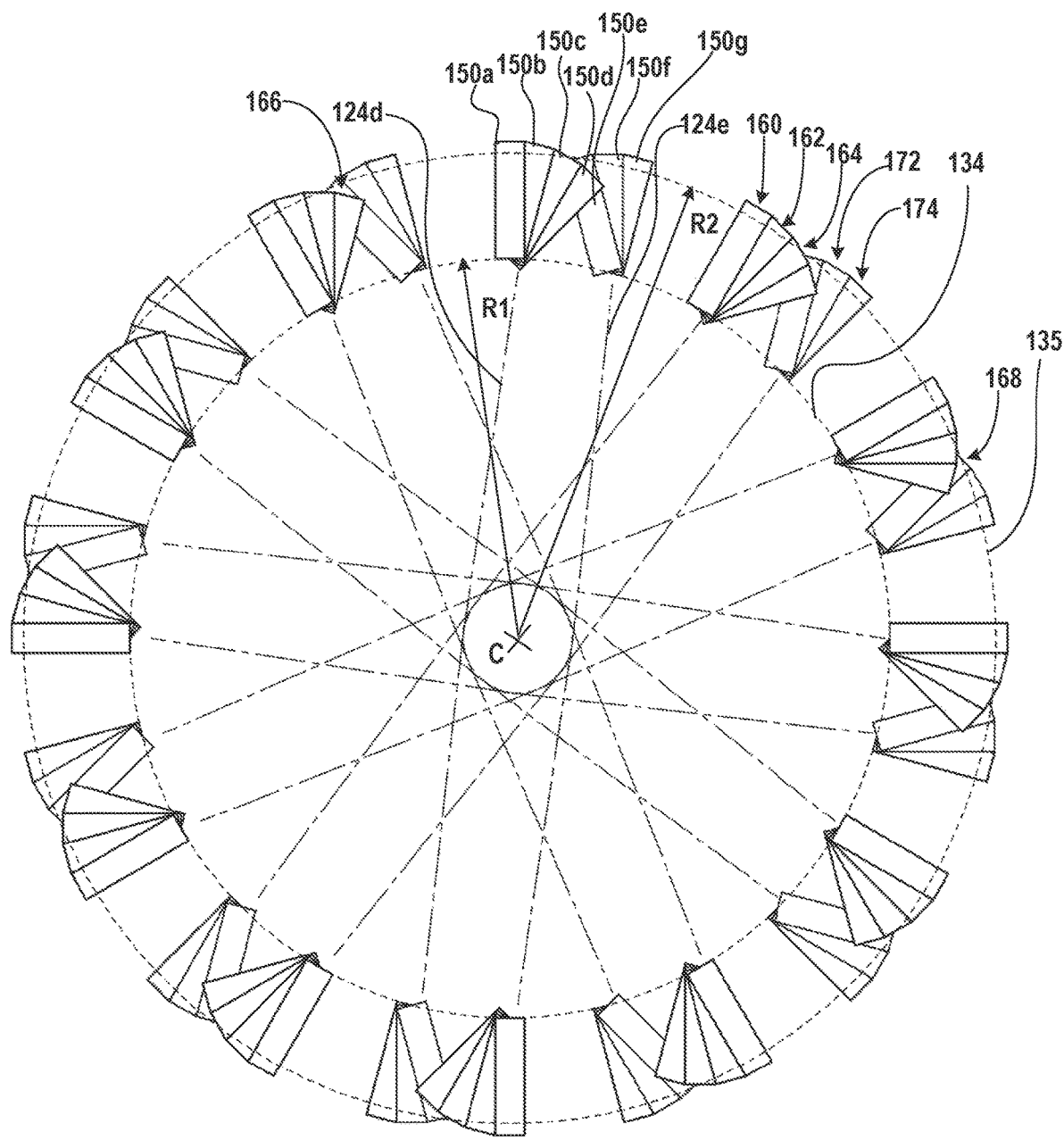
FIG. 15 is a side view of an uncured sidewall of a composite rim formed by strips positioned in a second woven pattern.
Figure 16:
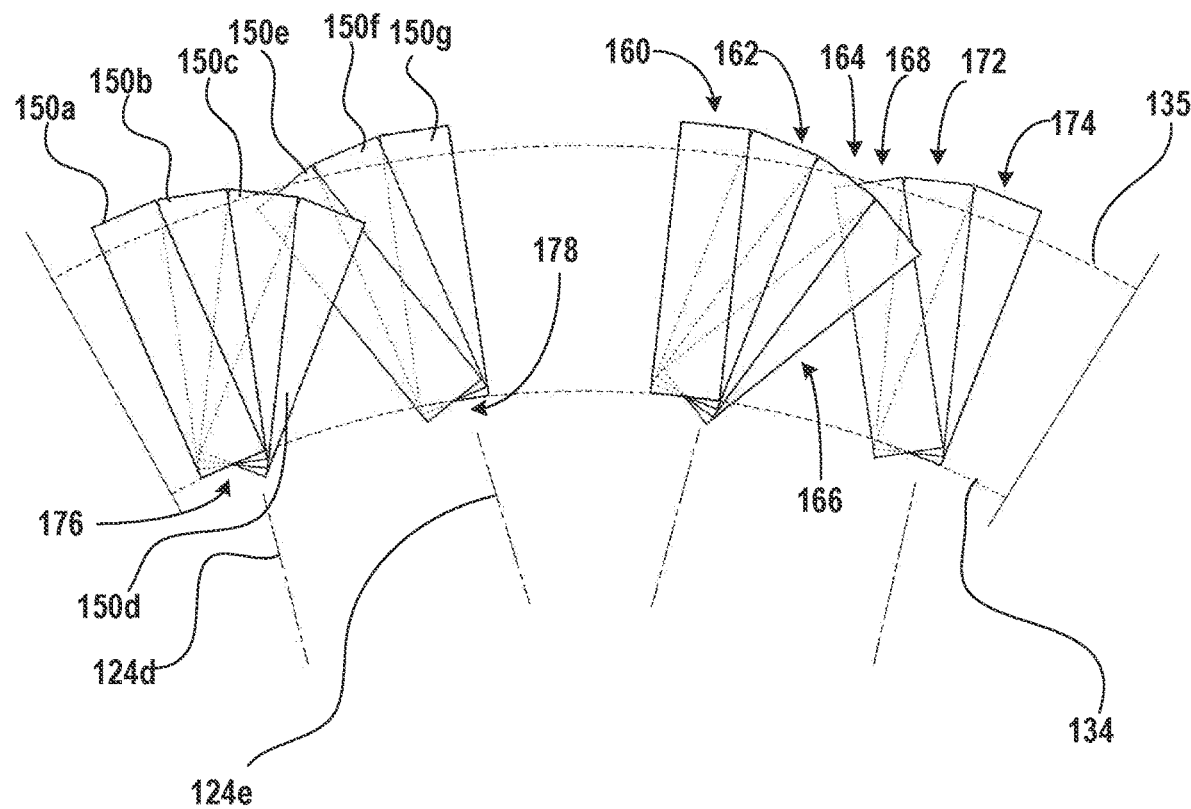
FIG. 16 is a close-up side view of the uncured sidewall of FIG. 15.

For example, FIGS. 15 and 16 show a layup pattern of strips 150 for the first sidewall 138 or the second sidewall prior to the curing process that includes more layers of composite material than is included in the example of FIGS. 13 and 14. The layup pattern (e.g., for the first sidewall 138) includes a first layer 160 of the composite material, a second layer 162 of the composite material, a third layer 164 of the composite material, a fourth layer 166 of the composite material, a fifth layer 168 of the composite material, a sixth layer 172 of the composite material, and a seventh layer 174 of the composite material. The first layer 160 includes the first strips 150a, the second layer 162 includes the second strips 150b, the third layer 164 includes the third strips 150c, the fourth layer 166 includes the fourth strips 150d, the fifth layer 168 includes the fifth strips 150e, the sixth layer 172 includes sixth strips 150f, and the seventh layer 174 includes seventh strips 150g. The layup pattern may include more or fewer layers of the composite material and/or one or more other materials.

The layup pattern for the first sidewall 138, for example, prior to the curing process, is circular in shape. A portion of the strips 150 extend beyond the first radius R1 and/or the second radius R2, respectively, and the material extending beyond the first radius R1 and the second radius R2 may not be removed, such that the inner circumference 134 and/or the outer circumference 135 of the rim 122 have variable radii, respectively. The first sidewall 138 may include any number of strips 150. For example, the first sidewall 138 may include 84 strips 150. More or fewer strips 150 may be included within the first sidewall 138 depending on a size and/or a shape of the strips 150, and/or a size of the rim 122.

The first layer 160, the second layer 162, the third layer 164, the fourth layer 166, the fifth layer 168, the sixth layer 172, and the seventh layer 174 of the composite material form a woven layup pattern that is aligned with the spokes 124 of the rim 122. Different subsets of layers are aligned with different subsets of the spokes 124. For example, a first subset of the layers (e.g., the first layer 160, the second layer 162, the third layer 164, and the fourth layer 166) are aligned with a first subset of the spokes 124d, and a second subset of the layers (e.g., the fifth layer 168, the sixth layer 172, and the seventh layer 174) are aligned with a second subset of the spokes 124e. Strips 150 of the first subset of the layers (e.g., the third strips 150c and the fourth strips 150d) overlap strips of the second subset of the layers (e.g., the fifth strips 150e), respectively. Referring to FIG. 16, the first subset of the layers form first fan-like layup patterns 176 arranged about the center C and aligned with the first subset of spokes 124d, respectively, and the second subset of the layers form second fan-like layup patterns 178 arranged about the center C and aligned with the second subset of spokes 124e. The first fan-like layup pattern 176 and the second fan-like layup pattern 178 are not symmetrical about any strips 150 within the respective layup pattern. In the example shown in FIGS. 15 and 16, no centerlines of respective strips 150 exactly align with any of the spokes 124. Adjacent first and second fan-like layup patterns 176, 178 spread out (e.g., fan) towards each other to provide the nodal support.

Figure 17:
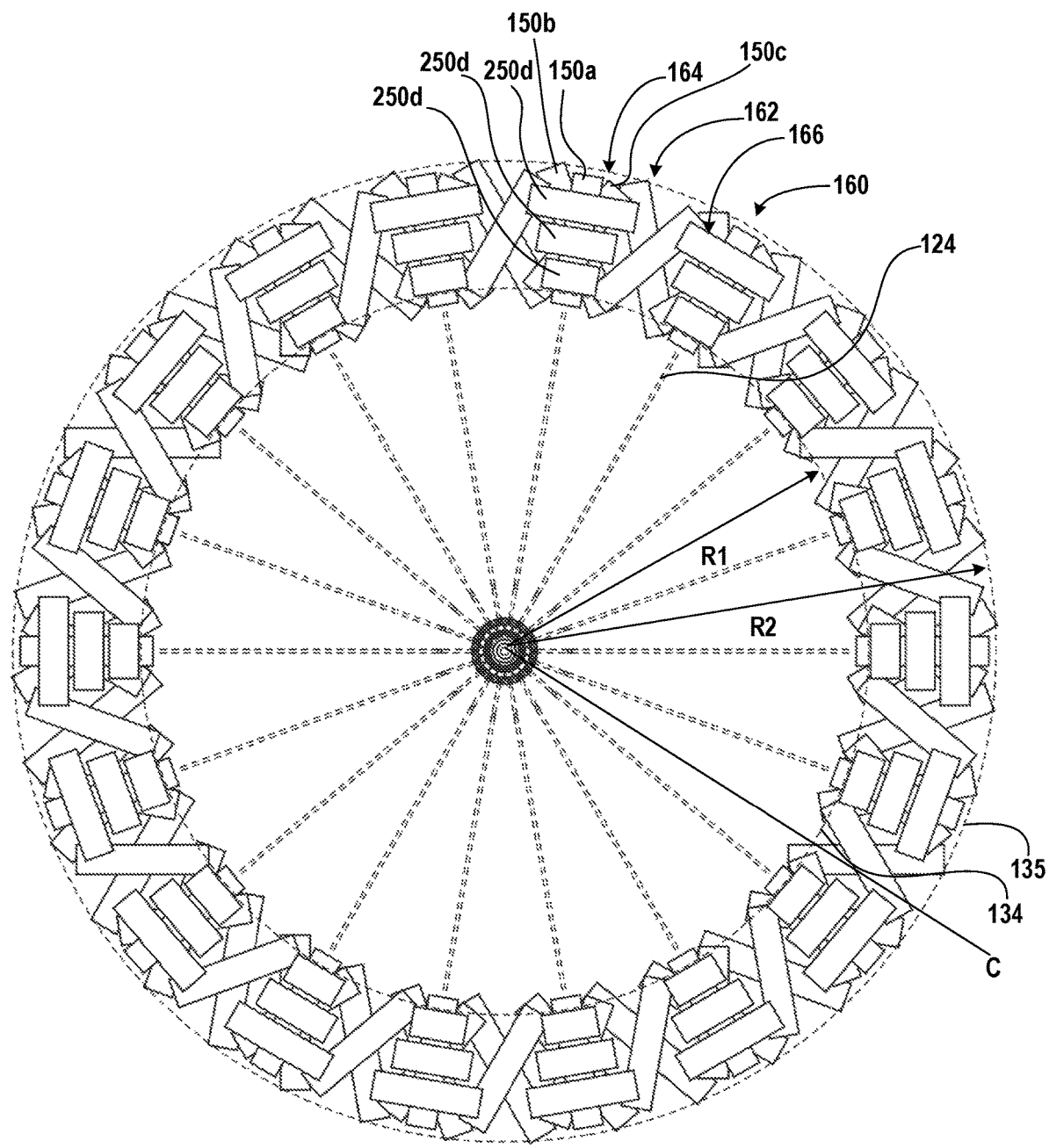
FIG. 17 is a side view of an uncured sidewall of a composite rim formed by strips positioned in a third woven pattern.
Figure 18:
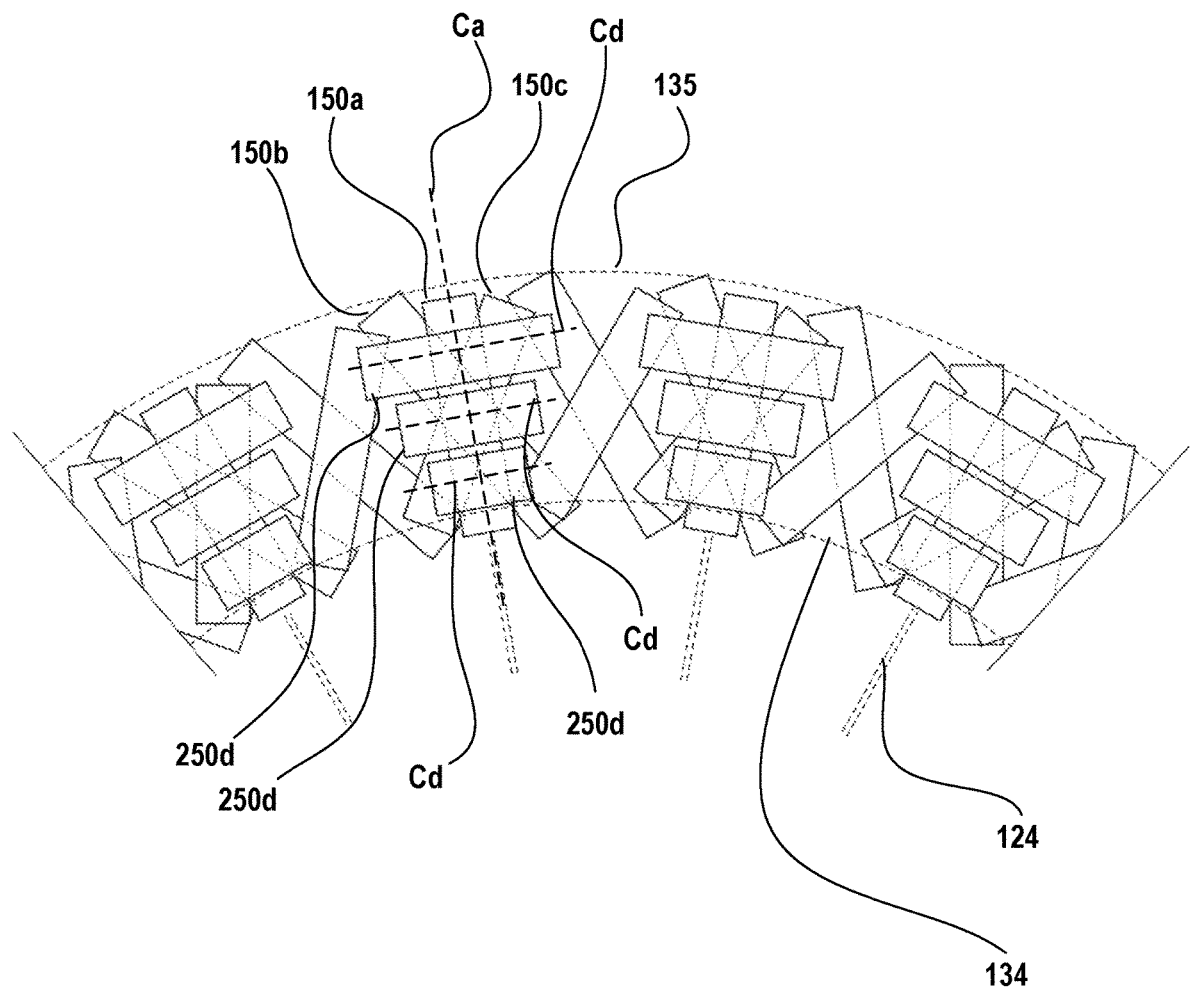
FIG. 18 is a close-up side view of the uncured sidewall of FIG. 17.

FIGS. 17 and 18 show a layup pattern of strips 150 for the first sidewall 138 or the second sidewall prior to the curing process that includes fewer layers of composite material than is included in the example of FIGS. 13 and 14 and FIGS. 15 and 16, respectively. The layup pattern (e.g., for the first sidewall 138) includes a first layer 160 of the composite material, a second layer 162 of the composite material, a third layer 164 of the composite material, and a fourth layer 166 of the composite material. The layup pattern may include more or fewer layers of the composite material and/or one or more other materials.

Referring to FIG. 18, Centerlines Ca of the first strips 150a of the first layer 160 are aligned with the spokes 124, respectively. At the spokes 124, second strips 150b of the second layer 162 and third strips 150c of the third layer 164 are angled relative to the first strips 150 in opposite directions, respectively. The fourth layer 166 includes, at each spoke 124, a plurality of fourth strips 250d of different lengths (e.g., decreasing lengths from the second radius R2 to the first radius R1). For example, at each spoke 124, the fourth layer 166 includes three fourth strips 250d positioned, such that the centerlines Cd of the fourth strips 250d are perpendicular to the centerline Ca of the first strip 150a. An additional third strip 150c of the third layer 164 overlapping an additional second strip 150b of the second layer 162 are positioned between each of the spokes 124 to provide further support for the first sidewall 138 or the second sidewall of the rim 122.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A rim for a bicycle wheel, the rim comprising:
    a radially outer tire engaging portion disposed along an outer circumference of the rim, the radially outer tire engaging portion having a first side and a second side spaced apart from the first side; and
    a plurality of strips of a composite material arranged about a hole through the plurality of strips, the hole being radially inner relative to the radially outer tire engaging portion,
    wherein each strip of the plurality of strips of the composite material has substantially unidirectional fiber orientation in a direction along a length of the respective strip, such that at least a portion of the fibers of the respective strip are parallel to the direction along the length of the respective strip,
    wherein one or more fibers of the portion of the fibers of the respective strip extend from the outer circumference of the rim, at the first side of the radially outer tire engaging portion, past the hole, to the outer circumference of the rim, at the second side of the radially outer tire engaging portion,
    wherein the plurality of strips are at least part of a wall of the rim, the wall formed entirely of non-metallic materials in the region adjacent to the hole.

2. The rim of claim 1, wherein the fibers of the respective strip are carbon fibers.

3. The rim of claim 1, wherein the plurality of strips partially form a first sidewall, a second sidewall spaced apart from the first sidewall, and a radially inner portion disposed along an inner circumference of the rim, each of the first sidewall and the second sidewall extending between the radially inner portion and the radially outer tire engaging portion.

4. The rim of claim 3, wherein the plurality of strips of the composite material is a plurality of first strips, and the hole is a first hole,
    wherein the rim further includes a plurality of second strips of the composite material and a second hole through the plurality of second strips, the plurality of second strips being nonparallel to each other, wherein the plurality of second strips are positioned about the second hole through the plurality of second strips, and
    wherein the second hole is positioned at a distance from the first hole along the inner circumference of the rim.

5. The rim of claim 4, wherein at least one first strip of the plurality of first strips overlaps at least one second strip of the plurality of second strips.

* * * * *